United States Patent
Ito et al.

(10) Patent No.: US 6,583,587 B2
(45) Date of Patent: Jun. 24, 2003

(54) DISCHARGE LAMP LIGHTING CIRCUIT

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/083,994

(22) Filed: Feb. 25, 2002

(65) Prior Publication Data

US 2002/0117973 A1 Aug. 29, 2002

(30) Foreign Application Priority Data

Feb. 26, 2001 (JP) ........................................ 2001-050158

(51) Int. Cl.[7] ............................................... G05F 1/00
(52) U.S. Cl. ................... 315/308; 315/291; 315/209 R; 315/DIG. 5
(58) Field of Search ................................ 315/308, 307, 315/291, 297, 209 R, 224, DIG. 5, DIG. 7

(56) References Cited

U.S. PATENT DOCUMENTS

| | | | |
|---|---|---|---|
| 5,142,203 A | 8/1992 | Oda et al. .................... | 315/308 |
| 5,212,428 A | 5/1993 | Sasaki et al. ................ | 318/308 |
| 5,572,094 A | 11/1996 | Yamashita et al. .......... | 315/308 |
| 6,153,987 A | 11/2000 | Toda et al. .................. | 315/308 |
| 6,452,345 B1 * | 9/2002 | Okura ......................... | 315/307 |

* cited by examiner

Primary Examiner—Don Wong
Assistant Examiner—Tuyet T. Vo
(74) Attorney, Agent, or Firm—Fish & Richardson PC

(57) ABSTRACT

A discharge lamp lighting circuit adapted to control a transient power corresponding to a cooling condition or a light-out time of a discharge lamp without using a capacitor or storage device having a large capacity, thereby reducing a cost and a size. Power control in a steady state of a discharge lamp is carried out in response to a detection signal for a voltage and a current in the discharge lamp, and a power to be transiently applied to the discharge lamp is controlled before a transition to the power control. The power to be transiently applied is set to be higher than the power in the steady state, thereby promoting light emission of the discharge lamp. An increment in the transient applied power which exceeds the power in the steady state is specified corresponding to a voltage applied to the discharge lamp, a variation in the voltage and a time elapsed from a time that the discharge lamp is lighted up or a start of an operation of a lighting circuit. More specifically, a dedicated circuit for detecting the light-out time of the discharge lamp is eliminated to utilize only detection information required for the power control of the discharge lamp.

9 Claims, 17 Drawing Sheets

FIG. 4
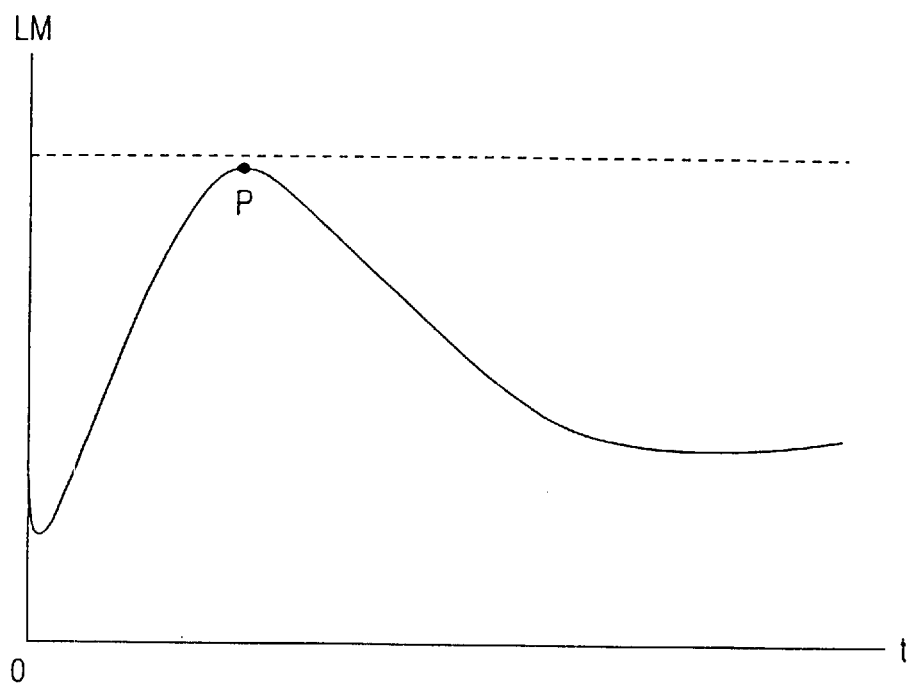
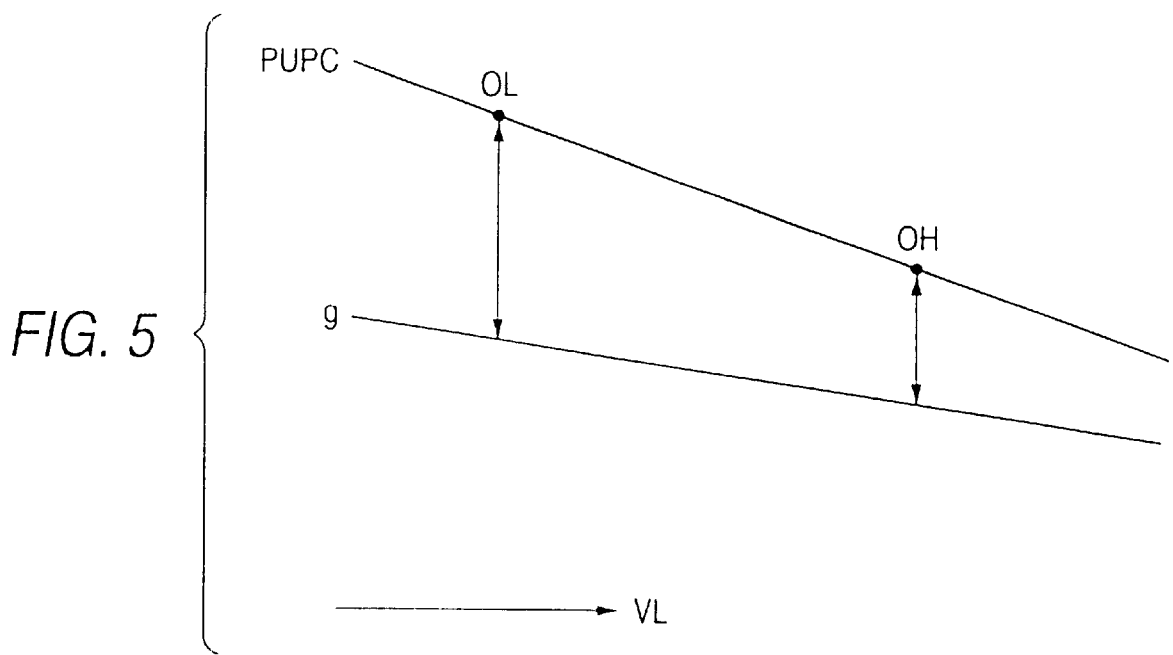
FIG. 5

— MULTIBIT DATA LINE
— 1-BIT DATA LINE

DISCHARGE LAMP LIGHTING CIRCUIT

BACKGROUND OF THE INVENTION

The present invention relates to a technique for reducing a cost and size for the control of transient power application in a discharge lamp lighting circuit.

There has been known a lighting circuit for a discharge lamp (a metal halide lamp) comprising a DC power circuit, a DC-AC converting circuit and a starting circuit (a so-called starter circuit). For example, in such a structure that a DC—DC converter is used for the DC power circuit and a full bridge type circuit (in which four semiconductor switching elements make two pairs respectively to alternately carry out ON/OFF control) and a driver circuit thereof are used for the DC-AC converting circuit, a voltage having a positive polarity (or a negative polarity) to be output from the DC—DC converter is converted into a rectangular wave-shaped voltage in the full bridge type circuit and the rectangular wave-shaped voltage is then supplied to the discharge lamp.

The starting property of the discharge lamp is to be enhanced in respect of safety in utilization for a light source for a vehicle, for example, and it is preferable that a luminous flux should be increased to have a luminous flux value in a steady state as quickly as possible. In particular, in the case in which the discharge lamp in a cold state is to be lighted up after a comparatively long time passes since last lighting (a so-called cold start), it is necessary to apply a power which is several times (approximately twice or three times) as high as a steady-state power. Moreover, in the case in which a long time does not pass after the last lighting and a comparatively warm discharge lamp is to be lighted up (a so-called hot start), it is preferable to apply the power which is almost slightly higher than the steady-state power. More specifically, if a power which is almost equal to the power in the case of the cold start is applied in the latter case, a deterioration or a reduction in a lifetime might be caused by a thermal stress applied to the discharge lamp. Moreover, there is a problem in that a bad effect is produced by excessive light-up (safety is deteriorated).

Accordingly, it is necessary to predict and detect an extent of the cooling condition of the discharge lamp or a time elapsed after light-out and to then apply a power corresponding to the state of the discharge lamp. Referring to the cooling condition of the discharge lamp and the detection of a light-out time, the following methods have been known.

(1) A method of utilizing a discharge time constant of a capacitor; and (2) a method of storing a voltage applied to a discharge lamp in a steady state and comparing the stored voltage with a voltage applied when the discharge lamp is lighted up.

First of all, referring to the (1), a capacitor is charged to be brought into a full charge state while a lighting circuit is started to light up the discharge lamp, and the capacitor starts a discharge when the discharge lamp is lighted out in response to an instruction for stopping the discharge lamp. At the time of next starting, if the number of electric charges remaining in the capacitor is smaller, an elapsed time is longer. Therefore, if the terminal voltage of the capacitor is detected, the time elapsed from last light-out (a light-out time) can be known. According to such a method, if the terminal voltage of the capacitor is low, a power supplied to the discharge lamp is increased in the control of the application of a transient power.

Referring to the (2), a voltage applied to the discharge lamp when the discharge lamp is lighted up is compared with a predetermined storage value (for example, a value of a voltage applied to the discharge lamp in a last steady state or a mean value thereof), and furthermore, a change in the voltage after the light-up and the asymptotic condition of the voltage to have a voltage value in the steady state are monitored. Consequently, it is possible to predict the cooling condition of the discharge lamp or the light-out time. According to such a method, therefore, it is possible to obtain an advantage that a necessary power can be applied to promote light emission while predicting the state of the discharge lamp.

In the method described above, however, the following drawbacks might be caused.

In the method (1), first of all, the capacity of a capacitor is large (for example, approximately several tens $\mu$F are required when a time of several tens seconds to a few minutes is detected for the light-out time), and a disadvantage is produced in respect of a cost and a size. In addition, there is a possibility that the influence of a leakage current of the capacitor itself might adversely affect the characteristic of time detection because a discharge is required with a micro current.

Moreover, a memory (a nonvolatile RAM) is required for holding the storage value of the method (2). Also when the lighting circuit is started or the discharge lamp is lighted out, stored information is to be held (therefore, a dedicated memory which does not carry out an initializing process is to be provided separately or a computer is to be used for a control configuration).

SUMMARY OF THE INVENTION

The invention has an object to reduce a cost and a size by carrying out control without using a capacitor or a storage device which has a large capacity when performing transient power control corresponding to the cooling condition of a discharge lamp and a light-out time.

In order to solve the problems described above, the invention provides a discharge lamp lighting circuit comprising a DC—DC converting circuit for receiving a DC input voltage and converting the DC input voltage into a desired DC voltage, a DC-AC converting circuit for converting an output voltage of the DC—DC converting circuit into an AC voltage and then supplying the AC voltage to a discharge lamp, a starting circuit for generating a starting pulse to be sent to the discharge lamp, and a control circuit for controlling a power to be applied to the discharge lamp, the discharge lamp lighting circuit having the following structure.

The control circuit carries out power control in a steady state of the discharge lamp in response to a detection signal for a voltage applied to the discharge lamp and a current flowing to the discharge lamp and carries out output control of the DC—DC converting circuit for controlling a power to be transiently applied to the discharge lamp before a transition to the power control.

The power to be transiently applied to the discharge lamp is set to be higher than the power in the steady state and light emission of the discharge lamp is promoted to cause a luminous flux of the discharge lamp to approximate to a luminous flux in a steady state in a short time.

An increment in the power to be transiently applied which exceeds the power in the steady state is specified by the control circuit corresponding to a voltage applied to the discharge lamp, a variation in the voltage and a time elapsed from a time that the discharge lamp is lighted up or a start of an operation of a lighting circuit.

According to the invention, therefore, it is necessary to utilize only detected information required for the power control of a discharge lamp when controlling a transient power to be applied to the discharge lamp, and furthermore, it is possible to omit a circuit or a device which is required for detecting a cooling condition after the light-out of the discharge lamp or an elapsed time from last light-out to current light-up.

BRIEF DESCRIPTION OF THE DRAWINGS

FIG. 4 is a chart for explaining a temporal change in a luminous flux corresponding to FIG. 3;

FIG. 5 is a diagram illustrating a control line having no parallel relationship;

DETAILED DESCRIPTION OF THE PREFERRED EMBODIMENTS

Figure 1:
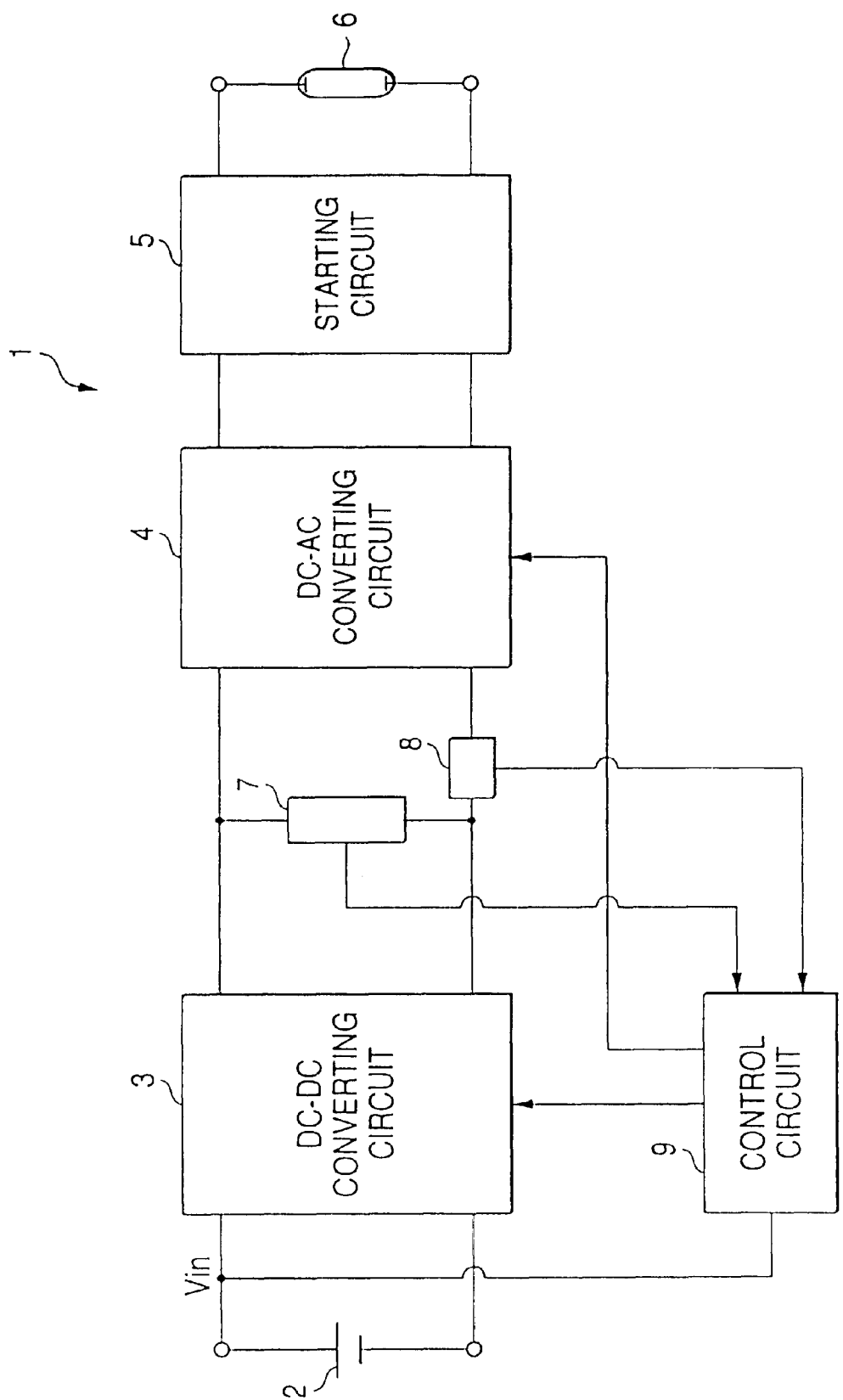
FIG. 1 is a circuit block diagram showing the basic structure of a discharge lamp lighting circuit according to the invention.

FIG. 1 shows a basic structure according to the invention and a discharge lamp lighting circuit 1 comprises a DC power source 2, a DC—DC converting circuit 3, a DC-AC converting circuit 4 and a starting circuit 5.

The DC—DC converting circuit 3 receives a DC input voltage (indicated as "Vin") from the DC power source 2 and raises or drops the same voltage, and outputs a desired DC voltage, and the output voltage is variably controlled in response to a control signal sent from a control circuit which will be described below. The DC—DC converter (of a chopper type or a flyback type) having the structure of a switching regulator is used for the DC—DC converting circuit 3, for example.

The DC-AC converting circuit 4 is provided to convert the output voltage of the DC—DC converting circuit 3 into an AC voltage and to supply the AC voltage to the discharge lamp 6, and includes a bridge type circuit (a full bridge circuit or a half bridge circuit) constituted by using a plurality of semiconductor switching elements and a driving circuit thereof, for example.

The starting circuit 5 is provided to generate a high voltage signal (a starting pulse) for starting the discharge lamp 6, thereby starting the discharge lamp 6, and the same starting signal is superposed on an AC voltage output from the DC-AC converting circuit 4 and is then applied to the discharge lamp 6.

A detecting circuit for detecting a voltage or a current related to the discharge lamp 6 has the following configurations.

A configuration in which a current detecting element (a shunt resistor or a detecting transformer) is connected to a discharge lamp to detect a value of a current flowing to the element in order to directly detect a tube voltage or a tube current of the discharge lamp, for example; and A configuration in which a voltage equivalent to the tube voltage or tube current of the discharge lamp is detected.

In FIG. 1, voltage detecting means 7 (for example, a circuit for detecting an output voltage by using a voltage dividing resistor) and current detecting means 8 (a detecting resistance element) are provided immediately after the DC—DC converting circuit 3 respectively, and a signal (or a substitute signal) equivalent to a voltage or current applied to the discharge lamp 6 is used and is sent to a control circuit 9.

The control circuit 9 serves to control a power applied to the discharge lamp 6 and has the following functions.

A power control function in a steady state, and

A power control function in a transient state.

In other words, the control circuit 9 carries out power control (constant power control) in the steady state of the discharge lamp in response to a detection signal for a voltage applied to the discharge lamp or a current flowing to the discharge lamp, and carries out the output control of the DC—DC converting circuit 3 in order to control a power to be transiently applied to the discharge lamp before a transition to the power control. In order to promote the light emission of the discharge lamp to approximate a luminous flux of the discharge lamp to a luminous flux in a steady state in a short time, a higher power than the power in the steady state is required for transient application.

For the control of the application of the transient power, it is necessary to specify a power to be applied depending on the state of the discharge lamp as described above. If a capacitor for detecting a light-out time or a memory for storing a voltage value is conventionally used, the drawbacks described above are caused. In the invention, therefore, existing information is utilized and only the existing information or information obtained by processing the existing information is used, thereby avoiding an increase in the number of components or the complexity of a circuit.

The existing information is as follows:

(A) a voltage applied to a discharge lamp and a variation in the same voltage; and (B) a time elapsed from a time that the discharge lamp is lighted up and the start of an operation of a lighting circuit.

Referring to the (A), first of all, it is necessary to detect the voltage applied to the discharge lamp for power control in a steady state, and furthermore, it is possible to detect the variation in the voltage with the passage of time.

Referring to the (B), it is possible to decide a time that the discharge lamp is lighted up based on a detected current or an amount of light emission, thereby measuring a time elapsed from that time or measuring a time elapsed from a time that the operation of a lighting circuit is started (a time that a lighting switch is turned on). For example, there are a circuit configuration in which a capacitor to be charged at a starting time point is utilized to detect a terminal voltage of the capacitor and to detect an elapsed time corresponding to a rise thereof (since a light-out time is not detected and the detection for a long time is not required, it is sufficient that the capacitor has a small capacity), and a circuit configuration in which an elapsed time (a time elapsed till the discharge lamp is lighted up in a steady state) is detected by counting a clock signal generated from the starting time point.

An increment (an increase) exceeding a power in the steady state in the control of the transient power is specified by the control circuit 9 corresponding to the information of the (A) and (B).

Before the description of a circuit structure, first of all, the power control according to the invention will be described with reference to FIGS. 2 to 12.

Figure 2:
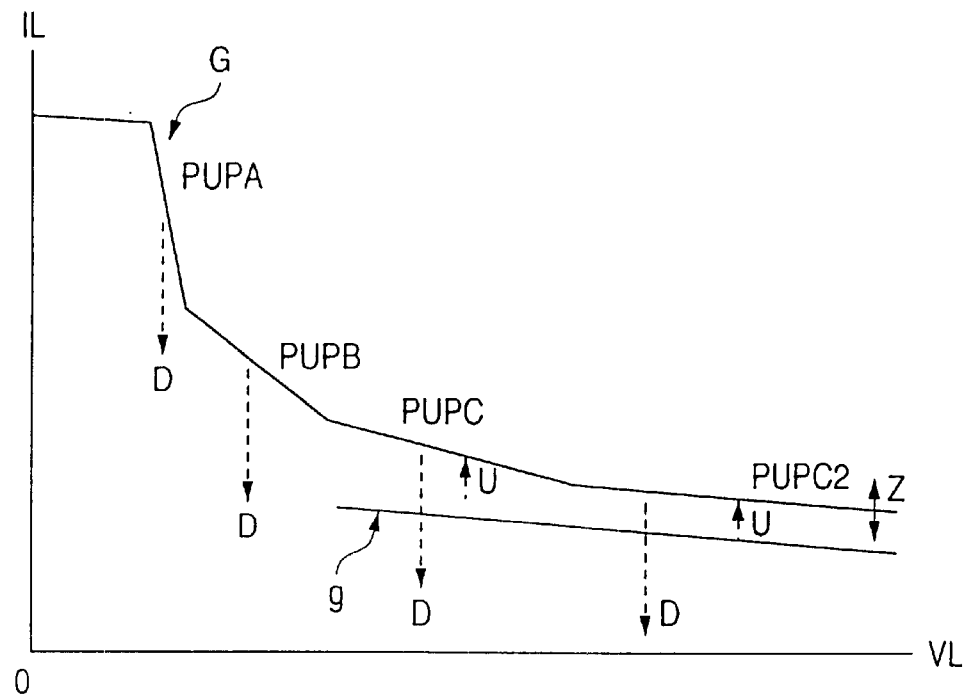
FIG. 2 is a chart for explaining a control line.

FIG. 2 shows a control characteristic by using a control line G, in which an axis of abscissa indicates "VL" as a voltage applied to a discharge lamp (or a detected voltage thereof) and an axis of ordinate indicates "IL" as a current flowing to the discharge lamp (or a detected current thereof), and a control line g indicates a control line with a rated power (a right and downward inclined line and, accurately, a constant power curve with a rated power which is subjected to linear approximation)

Portions other than a portion having IL in a maximum area (corresponding to control in which a large current flows in the early stage of lighting at the time of a cold start) in the control line G, that is, PUPA, PUPB, PUPC and PUPC2 from the left of the drawing in order are related to the control of the application of a transient power and they have the following meaning.

"PUPA"=a control portion adjacent to the right side of the maximum area and a right downward segment having the greatest gradient (absolute value) (a great negative gradient), "PUPB"=a control portion adjacent to the right side of the PUPA and a right downward segment having a smaller gradient than that of the PUPA, "PUPC"=a control portion adjacent to the right side of the PUPB and a right downward segment having a smaller gradient than that of the PUPB, and "PUPC2"=a control portion adjacent to the right side of the PUPC and a right downward segment having a gradient which is equal to or almost equal to that of the control line g.

While the four control portions are used for the control of the transient power in the example, it is also possible to carry out grouping into more portions (it is necessary to select a proper number in consideration of the complexity of a circuit structure).

In the power control, a different power can be applied if each control portion is shifted in a parallel direction with the IL axis. By lowering the control line to approach the VL axis as shown in arrows D, D, . . . in FIG. 2, the power to be applied can be decreased. In other words, if the control line G is wholly or partially lowered corresponding to the information of (A) or (B), the power can be applied depending on the state of the discharge lamp.

In consideration of only the control portions PUPA and PUPB related to the control of the transient power, it is assumed that the control line is not moved in parallel but is constant.

Figure 3:
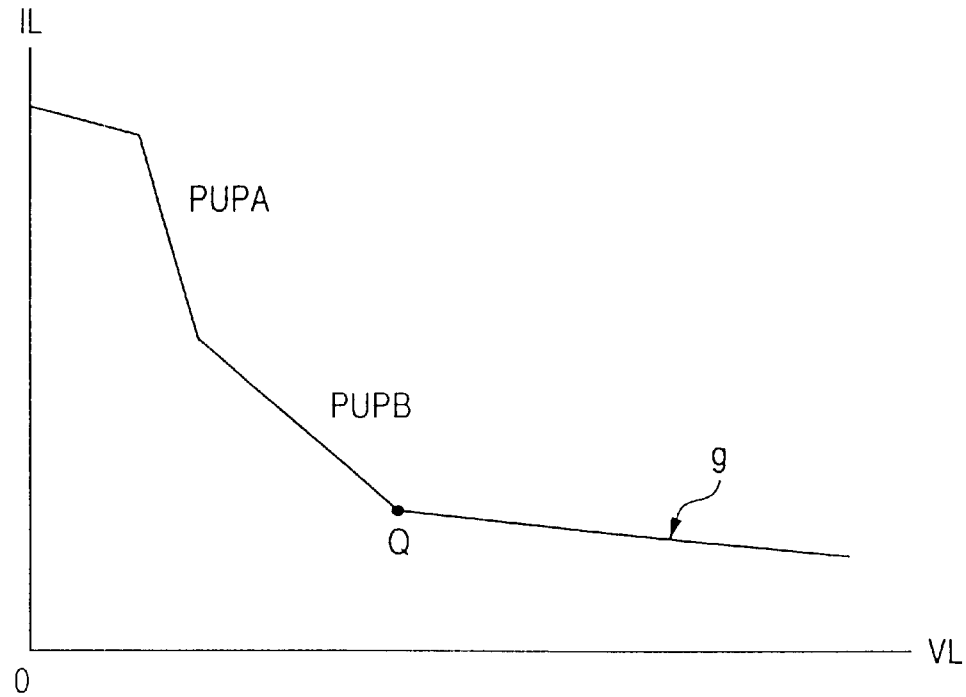
FIG. 3 is a chart for explaining transient control.

FIG. 3 shows the state, in which an axis of abscissa indicates a VL axis and an axis of ordinate indicates an IL axis.

In the steady state of the discharge lamp, it is expected that the control is carried out with a rated power of the discharge lamp. Therefore, the right end of the PUPB is connected to a control line g having a constant power approximation.

FIG. 4 schematically shows a temporal change in a luminous flux for the cold start of the discharge lamp (the change is exaggerated) in the case in which such a control characteristic is employed, wherein an axis of abscissa indicates a time "t" (a lighting start time is set to be a starting point) and an axis of ordinate indicates a luminous flux "LM" of the discharge lamp.

A position indicated as a P point in the drawing represents a peak of the luminous flux LM and the operating point of the discharge lamp is moved from the PUPA to the PUPB in FIG. 3, and then to the control line g. Therefore, the peak is taken after several seconds since the light-up of the discharge lamp and the luminous flux is then reduced gradually. In FIG. 3, a position on the control line which is indicated as a point Q (a position for movement from the PUPB to the control line g) corresponds to the P point and the luminous flux LM is not raised after that time.

In order to eliminate a reduction in the luminous flux in a portion subsequent to the peak in FIG. 4 at the time of the light-up of the cold start, accordingly, a control line capable of supplying a higher power than the power represented by the control line g is required. Therefore, the PUPC and the PUPC2 are to be provided.

The control portions PUPC and PUPC2 in FIG. 2 are positioned above the control line g (the side provided apart from the VL axis) in order to obtain a power required for compensating the reduction in the luminous flux. However, since the control portions cannot be always fixed to these positions (a power supplied to the discharge lamp exceeds a rated power during light-up in the steady state), it is necessary to lower the PUPC and the PUPC2 as shown in the arrows D and D in the drawing in the course of time.

There is a problem in that a variation is generated due to a manufacturing error or an individual difference in the discharge lamp with regard to a supplied voltage (hereinafter referred to as "VLs") in the steady state of the discharge lamp. Moreover, the voltage is varied with a temporal change in one discharge lamp.

In that case, if a control portion parallel with the control line g such as the PUPC2 is not provided, the power supplied to the discharge lamp is varied when the operating point approaches the voltage VLs in the steady state as shown in FIG. 5 (illustrating the case of only the PUPC).

FIG. 5 shows the control line g, the PUPC and two operating points OL and OH on the PUPC, wherein the operating point OL indicates the case in which the voltage VLs is low in the steady state and the operating point OH indicates the case in which the voltage VLs is high in the steady state.

In this case, a power to be applied on the operating point OL is higher than a power to be applied on the operating point OH. Therefore, it is apparent that a difference is made with regard to compensation for the reduction in the luminous flux (an overshoot of the luminous flux is caused if the applied power is too high, and a shortage of the luminous flux is caused if the applied power is low).

Accordingly, a difference in the control line g is fixed by the provision of the PUPC2 parallel with the control line g. Consequently, the applied power can be prevented from being nonuniform. In the case in which a variation in the characteristic of the discharge lamp can range within a predetermined tolerance, it is a matter of course that the PUPC2 is not used but only the PUPC can be utilized or only the PUPC2 can be used, and the PUPC and the PUPC2 can actually be used together.

In order to lower the control portions PUPC and PUPC2 in FIG. 2, operation data based on the voltage VL applied to the discharge lamp and a time elapsed from a lighting time (or the operation starting point of the lighting circuit) are used. For example, in the case of a digital operation, VL or a detected value thereof is converted into digital data to utilize an operation for a product value of a necessary bit value in the digital data and a necessary bit value in digital data indicative of time data. Preferably, control is carried out such that a speed of lowering the PUPC and the PUPC2 is reduced if the product value is increased. In other words, when VL is great or the elapsed time is longer, a speed at which the PUPC or the PUPC2 approaches the control line g is reduced. The reason is as follows.

First of all, a speed of lowering the control line is reduced with VL increased in order to prevent the shortage of a luminous flux for a discharge lamp having a high voltage VLs in a steady state in the light-up at the cold start.

Figure 6:
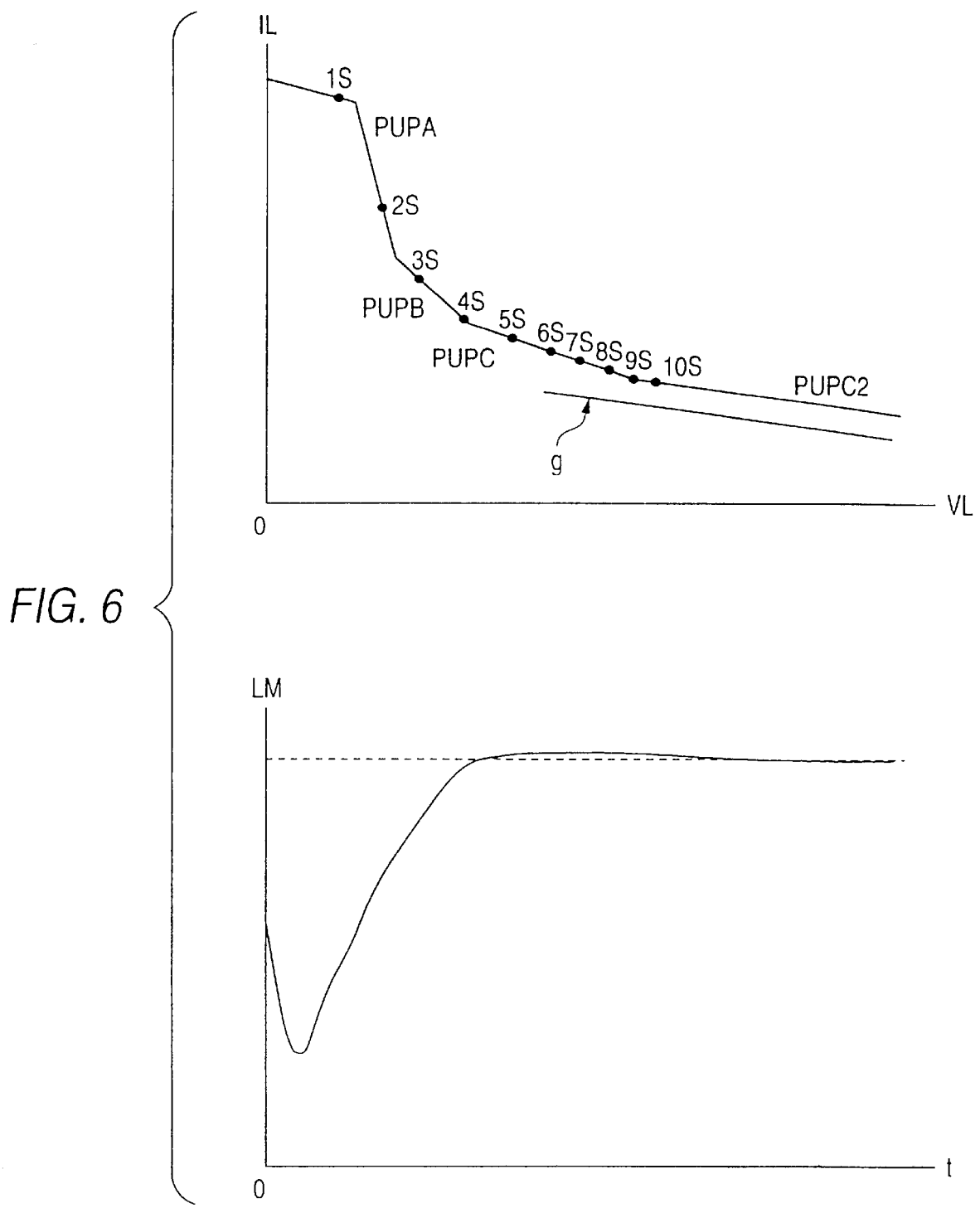
FIG. 6 is a chart for explaining the case in which a supplied voltage is low in a steady state, an upper chart showing a control line and a lower chart showing a temporal change in a luminous flux.
Figure 7:
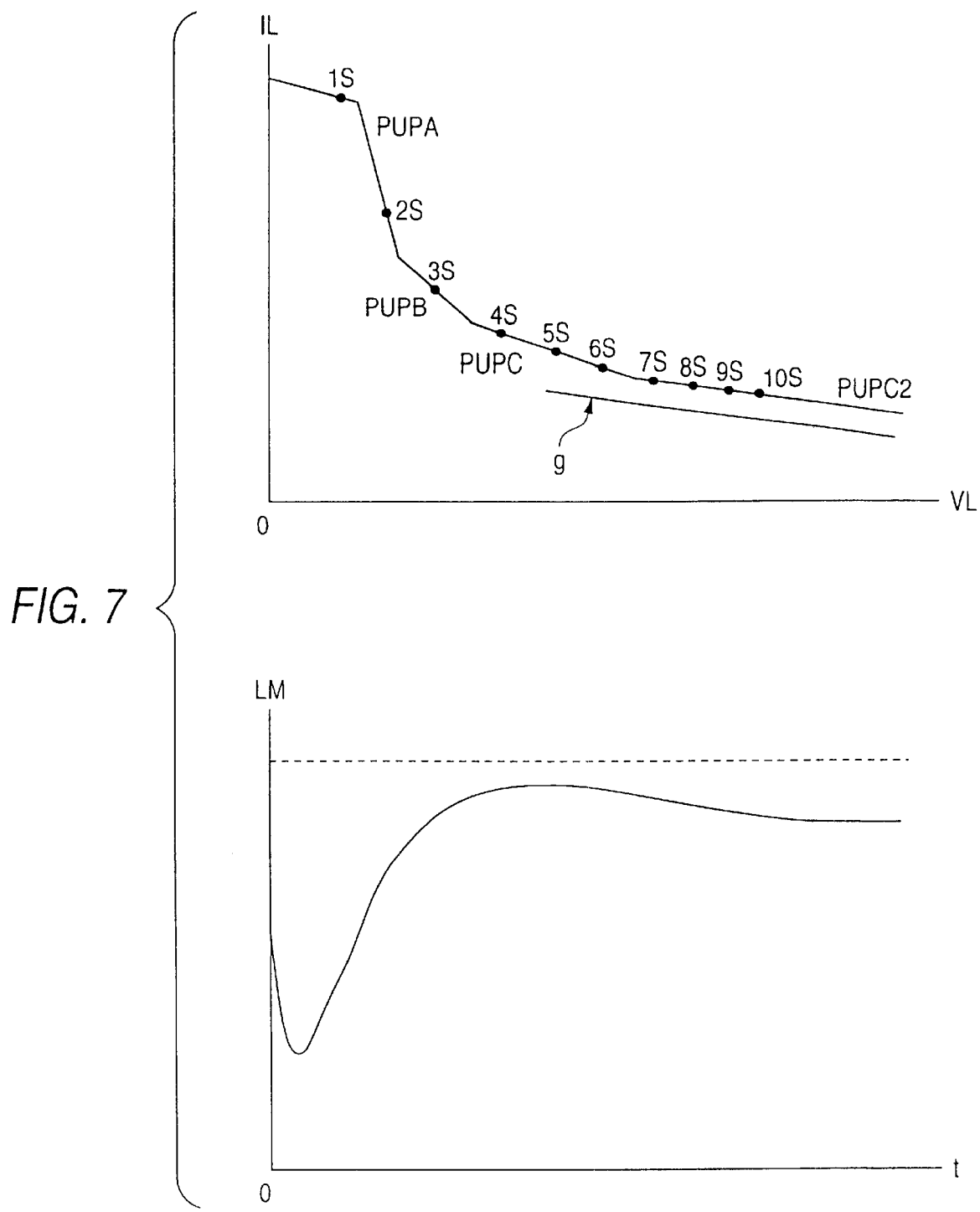
FIG. 7 is a chart for explaining the case in which the supplied voltage is high in the steady state, an upper chart showing a control line and a lower chart showing a temporal change in a luminous flux.

FIGS. 6 and 7 show a state in which the operating point on the control line is moved for two discharge lamps having different voltages VLs and a temporal change in a luminous flux LM. FIG. 6 shows the case in which VLs is low and FIG. 7 shows the case in which VLs is high. In these drawings, a graph positioned in an upper part is a VL-IL characteristic chart (points "1S" to "10S" on the control line indicate a temporal transition of the operating point and a greater numeric value attached before "S" implies a longer elapsed time), and a graph positioned in a lower part represents a temporal change in the luminous flux LM.

As shown in FIG. 6, if the value of VLs is small, a period for which PUPB and PUPC stay on the line is relatively long. As shown in FIG. 7, if the value of VLs is great, a period for which the PUPB and the PUPC stay on the line is relatively short. Accordingly, the discharge lamp having smaller VLs receives a power in a larger total amount.

In the case in which the speed at which the control line is to be lowered is constant, a difference between both the PUPB and the PUPC appears as a difference in the change of the luminous flux. For example, the overshoot of the luminous flux is small in FIG. 6, while the luminous flux is a little insufficient after a peak in FIG. 7. To the contrary, the overshoot might be remarkable in some cases in FIG. 6.

Accordingly, it is preferable that the speed of lowering the control line should be regulated depending on the value of VL in order to eliminate the overshoot for the temporal change in the luminous flux and to prevent the shortage of the luminous flux.

In order to prevent the state of the shortage of the luminous flux for a time of several tens seconds to approximately one minute in place of a short time of several seconds or ten seconds, the speed of lowering the control line is reduced when the elapsed time is long.

Figure 8:
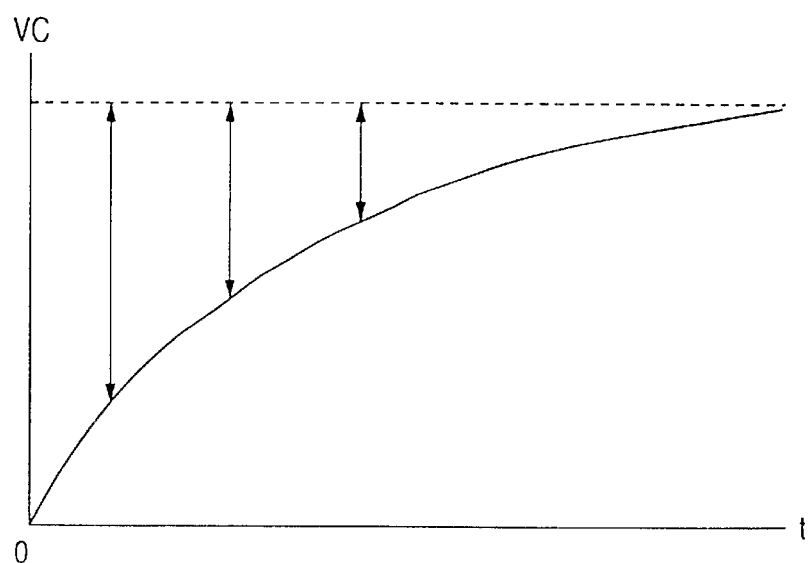
FIG. 8 is a chart for explaining a timing circuit using a capacitor.

FIG. 8 schematically shows a temporal change (a rise) in the terminal voltage (indicated as "VC") of a capacitor by setting the lighting time or lighting start time of the discharge lamp to be a starting point in the case in which a timing circuit is constituted by using the capacitor.

For example, in the case in which a CR circuit including a capacitor is used and a time constant during charging which is specified by the electrostatic capacity of the capacitor and the resistance value of a resistance element is utilized (for example, a voltage detecting circuit for detecting the terminal voltage of the capacitor is provided with such a structure that a supplied voltage obtained at the lighting start time is to be fed to the capacitor through a resistor), the terminal voltage VC is raised with the time constant and reaches a voltage at the time of full charging. Therefore, when the elapsed time is increased, a difference in a voltage shown in a two-way arrow in the drawing is reduced. The difference in a voltage corresponds to a transient power to be applied to the discharge lamp. Therefore, if the voltage VC is higher, a power value is smaller. The extent of a drop in the applied power (a reduction with the passage of time) corresponds to the speed of lowering the control line, and the speed is high when VC is low, while the same speed is low when the VC is high.

Figure 9:
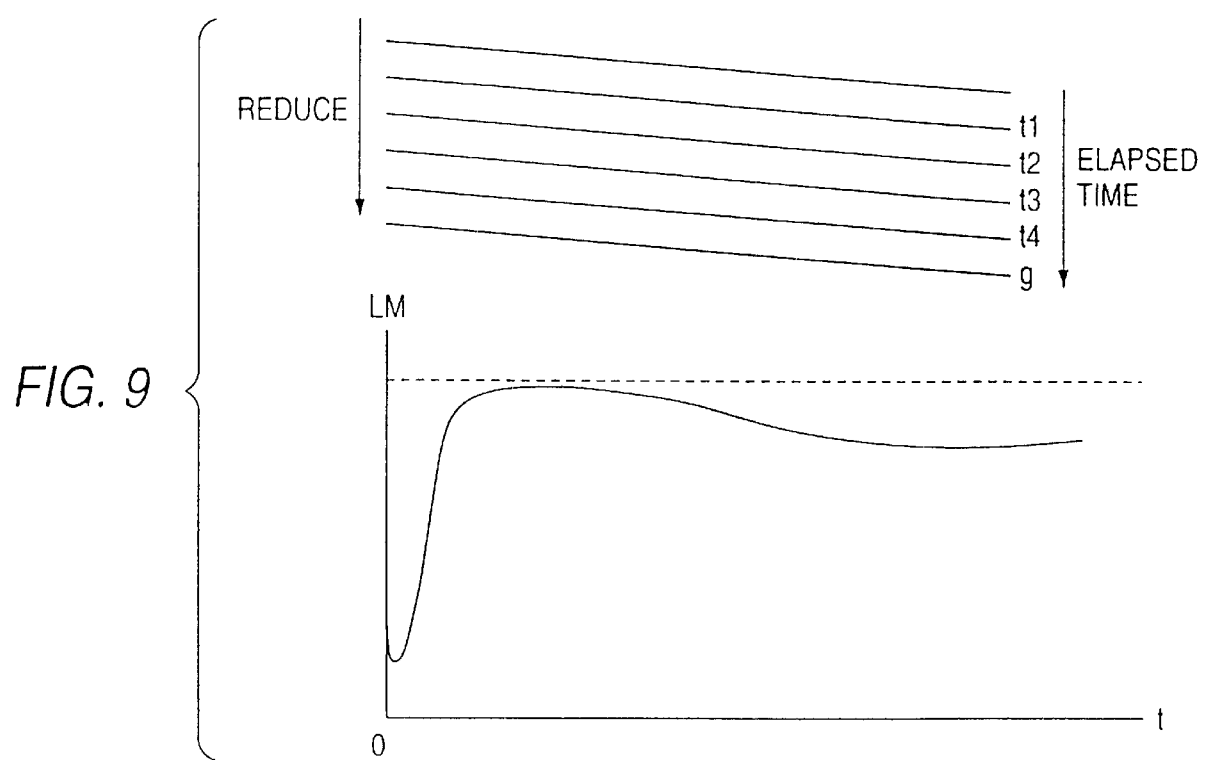
FIG. 9 is a chart showing an example of a change in the luminous flux in the case in which the control line is lowered at a constant speed with the passage of time.
Figure 10:
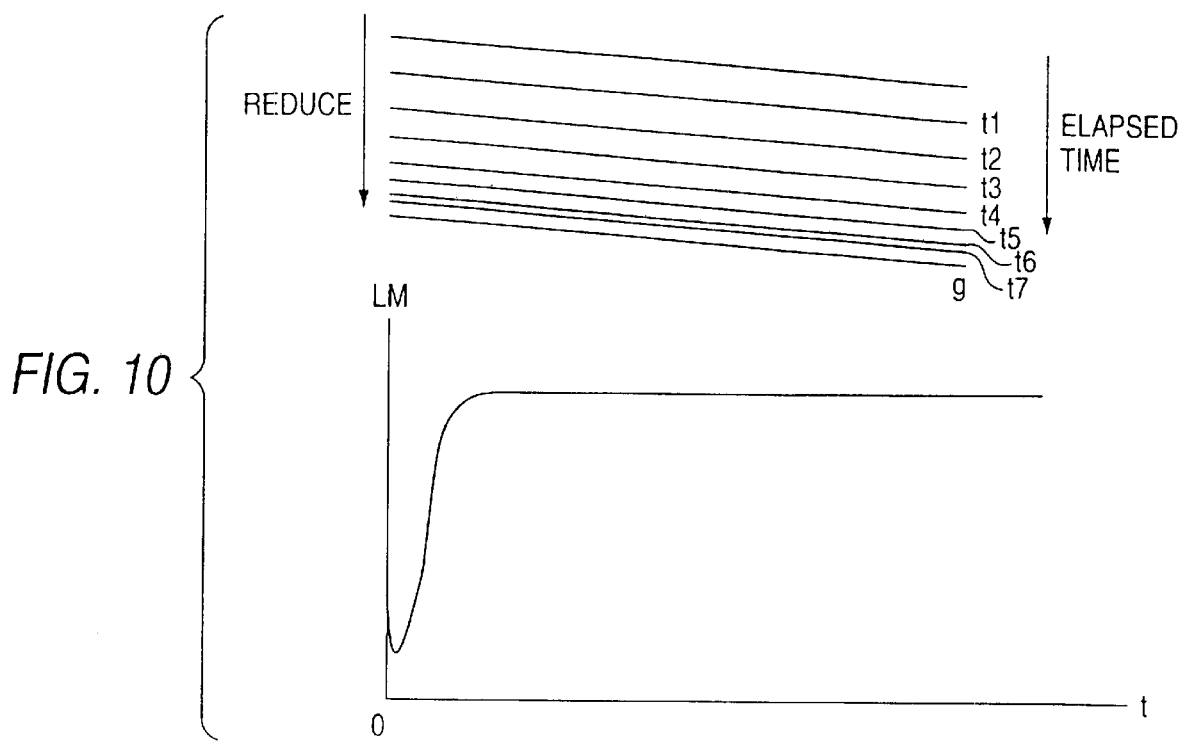
FIG. 10 is a chart showing an example of a change in the luminous flux in the case in which the control line is lowered through deceleration with the passage of time.

FIGS. 9 and 10 are charts for comparatively explaining a difference in the speed of lowering the control line, FIG. 9 showing the case in which the PUPC2 is lowered at a regular interval with the passage of time and FIG. 10 showing the case in which the PUPC2 is lowered at a lower speed with a longer elapsed time. An upper drawing shows a temporal transition in which the PUPC2 is lowered and a lower graph schematically shows a temporal change in a luminous flux.

As is apparent from a comparison of both drawings, the PUPC2 is lowered at a constant speed to reach the control line g with the passage of time (time t1<t2<t3<t4) in FIG. 9. Therefore, the luminous flux LM is less than a luminous flux in the steady state within a range from a rise thereof to a peak (which is shown in a broken line) and is thereby insufficient for a comparatively long period of time. On the other hand, in FIG. 10, the speed of lowering the PUPC2 is reduced when the PUPC2 approaches the control line g as shown in times t1 to t7 (a time is later with a greater numeral). Therefore, it is possible to remove an insufficient range after the peak in the luminous flux LM.

Also in the case in which timing is carried out by using an oscillation signal in place of the capacitor, it is possible to change the speed of lowering the control line by a method of changing the frequency of the signal.

If each of the PUPC and the PUPC2 is placed in the position shown in FIG. 2 (a position provided above the control line g) after the starting time of the lighting circuit (or a lighting start time that a lighting switch is turned on), drawbacks are caused at the time of the hot start of the discharge lamp. More specifically, in the case in which the discharge lamp which is still hot is lighted up again, a power corresponding to an operating point on the PUPC or PUPC2 is supplied to the discharge lamp. Therefore, the applied power is too high so that the overshoot of the luminous flux might be caused (in the case of the discharge lamp which has just been turned off, the voltage VL applied immediately after the light-out is almost equal to the voltage VLs in the steady state).

The PUPC and the PUPC2 are placed close to the control line g at the starting time of the lighting circuit or at the lighting start time that the switch is turned on, and are then moved upward from the control line g according to a certain control amount. The "certain control amount" implies an integrated value for a variation in the voltage VL.

Figure 11:
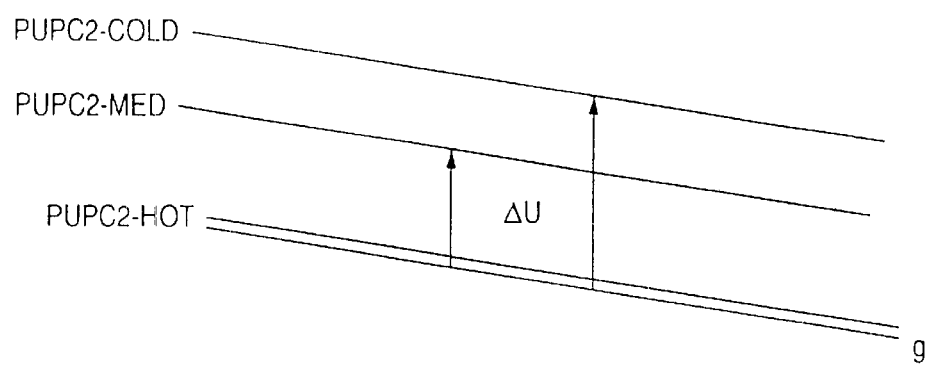
FIG. 11 is a diagram illustrating a method of raising the control line.

FIG. 11 shows a state in which the PUPC2 is moved upward according to the integrated value from a close portion to the control line g, for example. In the case in which the discharge lamp is not cooled down (PUPC2-hot), an upward movement amount "ΔU" is small. In the case in which the discharge lamp is completely cold in the same manner as that at the cold start (PUPC2-cold), the movement amount ΔU is the largest. PUPC2-med indicates an intermediate state therebetween.

Figure 12:
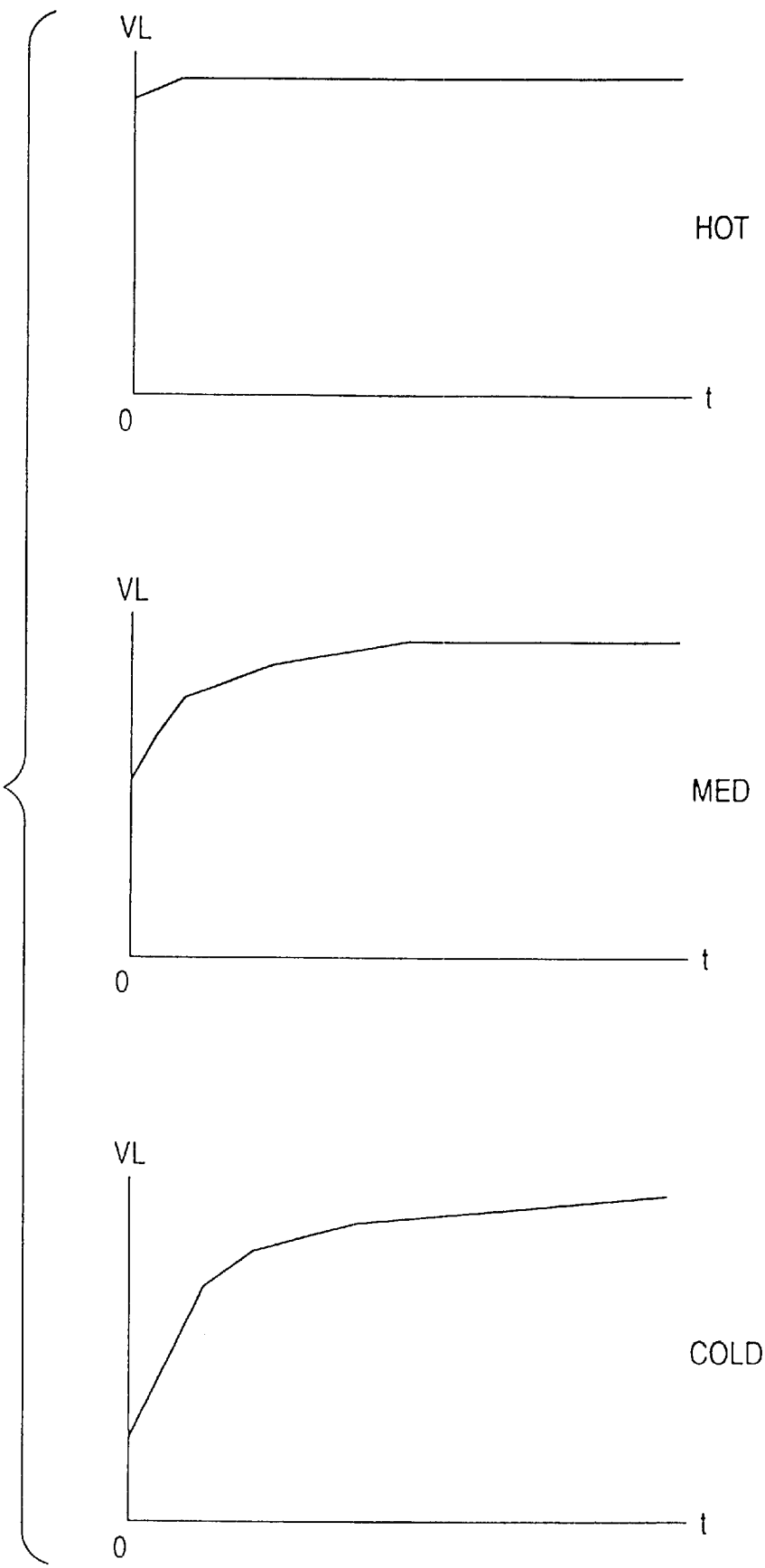
FIG. 12 is a chart showing a change in a voltage corresponding to the cooling condition of the discharge lamp.

FIG. 12 shows an example of a temporal change in the voltage VL corresponding to the state of the discharge lamp, a drawing in an upper stage showing the case in which the discharge lamp is lighted up again before it is cooled down, a drawing in a middle stage showing the case in which the discharge lamp cooled down slightly is lighted up again, and a drawing in a lower stage showing the case in which the discharge lamp cooled down completely is lighted up (cold start).

If the movement amount ΔU is specified according to the integrated value related to a variation in the voltage VL, a power can be applied corresponding to a manner in which the discharge lamp is cooled down, and furthermore, the luminous flux of the discharge lamp can be raised smoothly to gradually approximate to a steady-state value without the overshoot of the luminous flux or the shortage of the luminous flux.

Next, a circuit structure according to the invention will be described. While a PWM (pulse width modulation) control method which is well known in the power control of a discharge lamp will be taken as an example of the following description, it is a matter of course that the circuit structure according to the invention can be applied with reference to the following contents in control using another method such as a PFM (pulse frequency modulation) control method.

Figure 13:
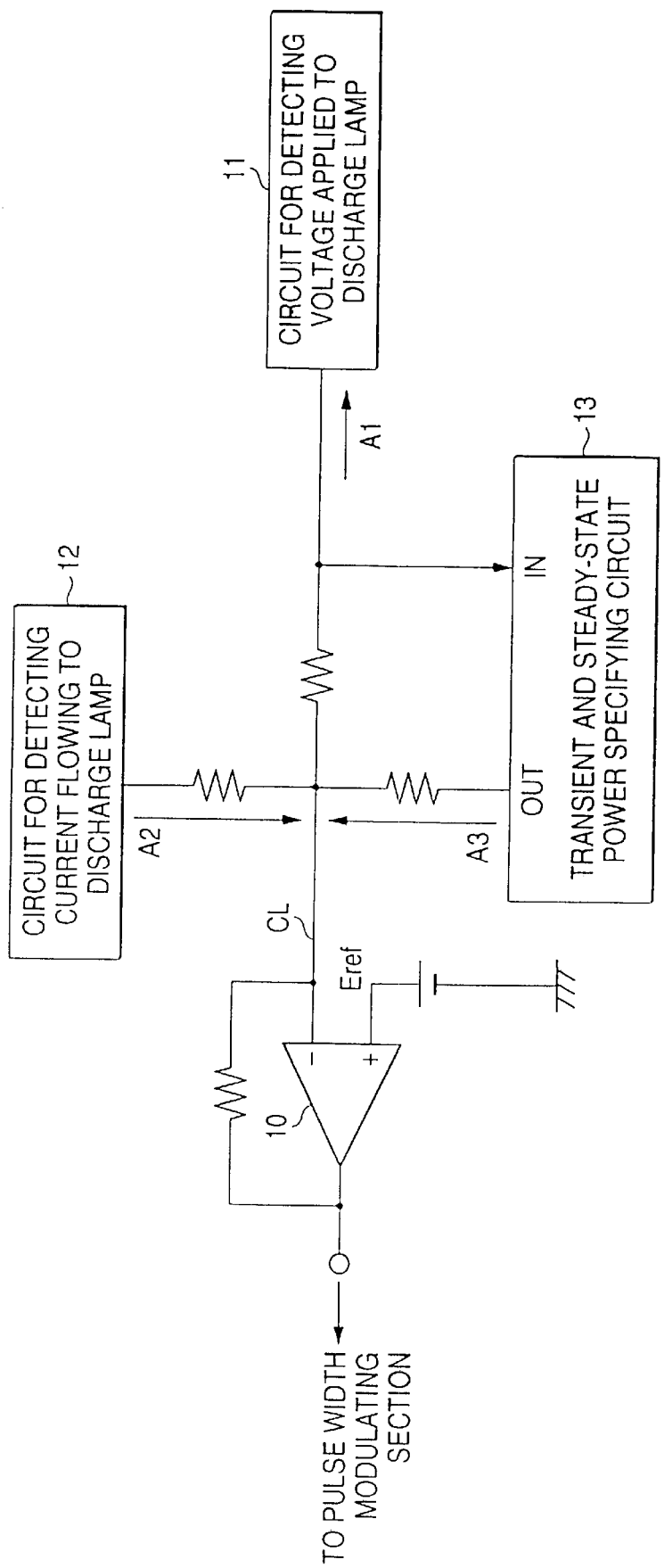
FIG. 13 is a diagram showing the structure of a main part for power control.

FIG. 13 is a diagram for explaining a control circuit for reflecting the power control of the control line on the PWM control, showing only a main part thereof.

A predetermined reference voltage "Eref" (indicated as a symbol of a constant voltage source in the drawing) is supplied to a positive side input terminal of an error amplifier 10, and the following circuit is connected to a control line CL connected to a negative side input terminal (the numerals in the parentheses denote designations).

A circuit (11) for detecting a voltage applied to a discharge lamp,

A circuit (12) for detecting a current flowing to the discharge lamp, and

A circuit (13) for specifying a transient and steady-state power.

The voltage detecting circuit 11 serves to detect the VL and the current detecting circuit 12 serves to detect the IL. Moreover, although an output terminal of each circuit portion is connected to a control line CL through each of resistors, a structure of a current output type does not require the resistors.

Referring to control in a transient area provided before the discharge lamp is stabilized and a steady-state area in which stable steady-state lighting is carried out, the transient and steady-state power specifying circuit 13 forms a characteristic based on the control portions of PUPA, PUPB, PUPC and PUPC2, a detection signal is supplied from the voltage detecting circuit 11 to an input terminal (IN) thereof and an output terminal (OUT) thereof is connected to the control line CL through a resistor.

With such a structure, when the output voltage of the error amplifier 10 is raised, the power supplied to the discharge lamp is increased (the error amplifier regulates the output voltage of a DC—DC converting circuit such that a negative side input voltage thereof is equal to a reference voltage Eref), and the output voltage of the error amplifier 10 is converted into a control signal to be sent to a switching element (a semiconductor element) in the DC—DC converting circuit through a PWM control section (a circuit section constituted by using a general purpose IC for PWM control which serves to generate a pulse signal having a duty cycle varied depending on a result of comparison of the levels of an input voltage and a saw tooth wave) or a driving circuit.

Arrows indicated as A1 to A3 in the drawing represent a contribution of each portion to a current input to the error amplifier 10 and the direction of the arrow is based on that of a control current in each portion. For example, the direction of the control current of the voltage detecting circuit 11 (see the arrow A1) is set to be apart from the error amplifier 10 (the direction of a current sink). Therefore, when the value of a current flowing in this direction is increased, the power to be supplied to the discharge lamp is raised. To the contrary, the direction of the control current of the current detecting circuit 12 (see the arrow A2) or the transient and steady-state power specifying circuit 13 (see the arrow A3) is set to approach the error amplifier 10 (the direction of a current source). Therefore, when the value of a current flowing in this direction is increased, the power to be supplied to the discharge lamp is reduced.

In any case, the power to be applied to the discharge lamp is decreased or increased corresponding to a direction in which a current flows into the control line CL from the circuit portion or flows out from the control line CL and the amount of the current.

Figure 14:
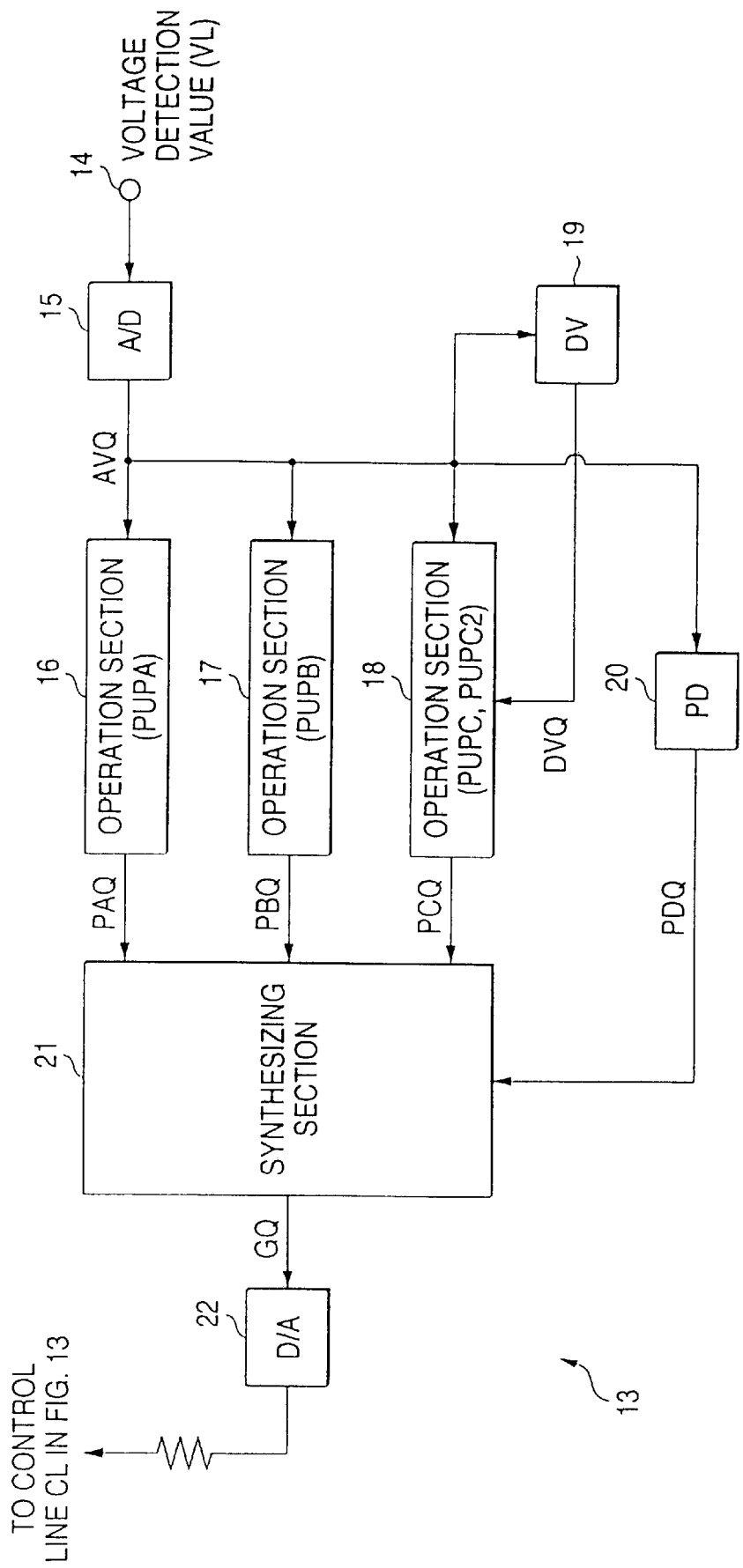
FIG. 14 is a block diagram showing an example of the circuit structure of a portion related to the formation of a control line.

FIG. 14 shows a main part of an example of the structure of the transient and steady-state power specifying circuit 13, illustrating an example in which a digital operation circuit is used (of course, it is possible to employ such a structure as to carry out a process having the same contents through an analog operation).

The circuit comprises the following elements (the numerals in the parentheses denote designations):

an analog-digital converting section (15);
an operation section (16) related to PUPA;
an operation section (17) related to PUPB;
an operation section (18) related to PUPC and PUPC2;
a voltage variation detecting section (19);
a power reduction control section (20);
a synthesizing section (21); and
a digital-analog converting section (22).

First of all, the detection signal of the voltage VL obtained by the voltage detecting circuit 11 is sent from an input terminal 14 to the analog-digital converting section 15 (which is abbreviated as "A/D" in the drawing) and is converted into digital data (which are data on a predetermined bit number and are referred to as "AVQ"). While a converting method has various configurations, a successive comparison type is preferable in respect of a circuit scale and a converting speed.

The data AVQ obtained after the conversion are transferred to the operation sections 16 to 18 respectively, and furthermore, to the voltage variation detecting section 19 and the power reduction control section 20.

While the operation sections 16 to 18 are required for creating a control line corresponding thereto, the basic creating procedure is the same and conforms to the following algorithm.

(1) A constant value of "a1" is set based on the position of an intersecting point of the control lines (PUPA, PUPB, PUPC) to be objects and the control line g.
(2) The data AVQ are subtracted from the constant value of "a1".
(3) The (2) is multiplied by a constant value of "a2".

Figure 15:
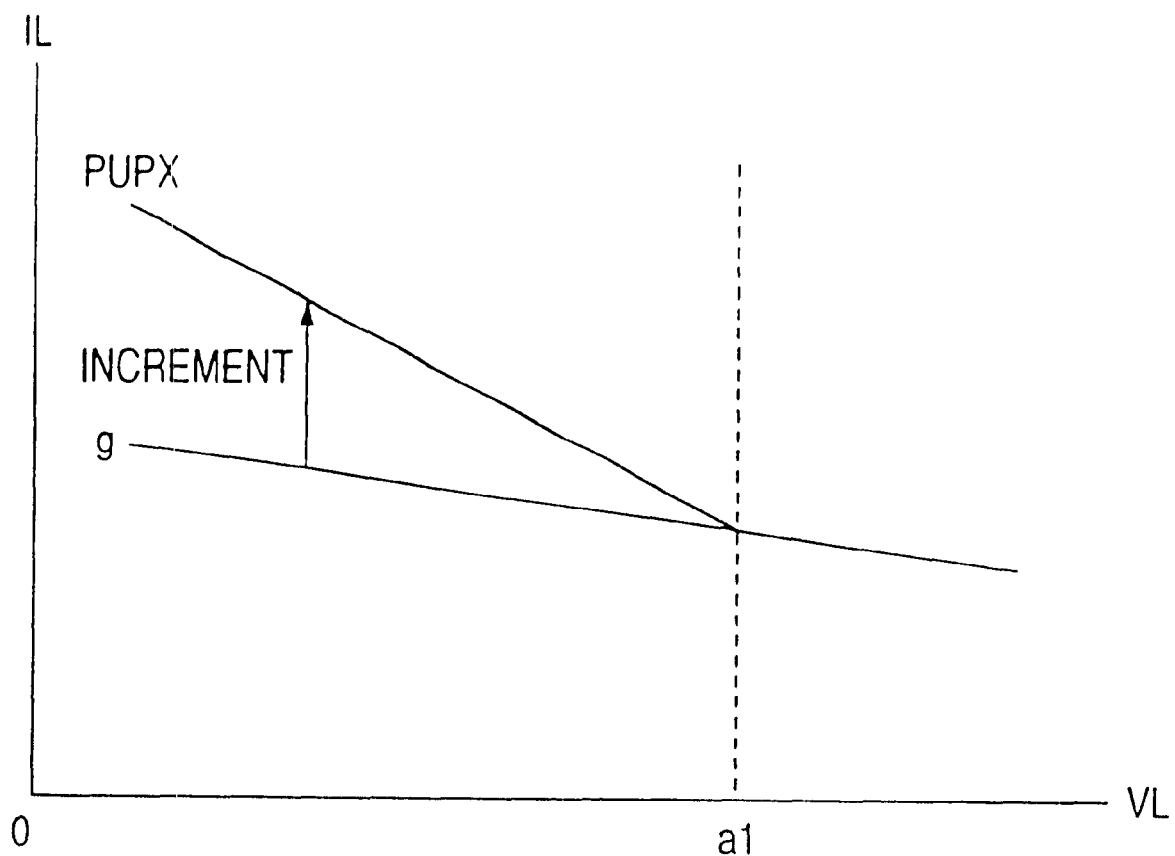
FIG. 15 is a chart for explaining a method of generating the control line together with FIG. 16, which is a VL-IL chart.

FIG. 15 shows a control line PUPX (X is A, B or C) to be an object on the basis of the control line g (a linear approximation curve of a rated power curve), an axis of abscissa indicating a VL axis and an axis of ordinate indicating an IL axis.

In the embodiment, a gradient (absolute value) of the control line PUPX is greater than a gradient (absolute value) of the control line g and a difference between a portion provided above the control line g and the control line g in the former case is equivalent to an increment of power supply to the discharge lamp. The VL value on the intersecting point of both control lines is the constant value a1.

Figure 16:
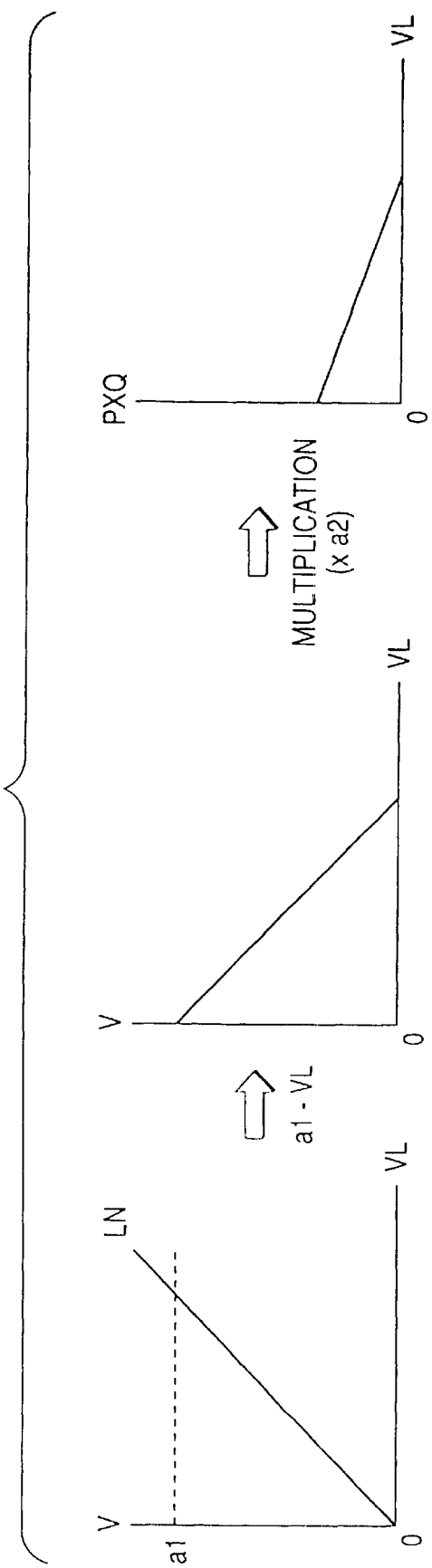
FIG. 16 is a chart illustrating a processing procedure in order.

FIG. 16 shows a procedure for generating a control line, in which a process proceeds from the left to the right.

A graph on the left side represents a straight line "LN" of V=VL (a right upward inclined line having a gradient of 1) and a level of "V=a1" (shown in a broken line), wherein an axis of abscissa indicates VL and an axis of ordinate indicates a voltage axis of "V".

Moreover, a graph in a middle part shows a straight line of "V=a1−VL", representing a result of the procedure (2).

A graph on the right side is obtained by performing a multiplication of a constant value a2 (which is less than 1 in the shown example) for the graph in the middle part, representing a result of the procedure (3). In the graph, an axis of abscissa indicates VL and an axis of ordinate indicates output data "PXQ" of the operation section (X is A, B or C, "PAQ" indicates output data of the operation section 16, "PBQ" indicates output data of the operation section 17 and "PCQ" indicates output data of the operation section 18).

As is apparent from "PXQ=a2·(a1−VL)=a2·a1−a2·VL", a linear function equation indicative of the characteristic of PXQ for VL exactly represents a straight line having a contact piece of "a2·a1" and a gradient of "−a2". Accordingly, it is apparent that a functional equation corresponding to PUPA, PUPB and PUPC is obtained by changing the constant values a1 and a2 (their numeric values are varied).

Referring to the PUPC2, the PUPC2 and the control line g have a parallel relationship in the VL-IL characteristic chart. For an operation, therefore, an addition of a certain value (referred to as "b") corresponds to a translation. Accordingly, a difference between the PUPC2 and the control line g is simply represented by a numeric value of "b" on the basis of the control line g.

Figure 17:
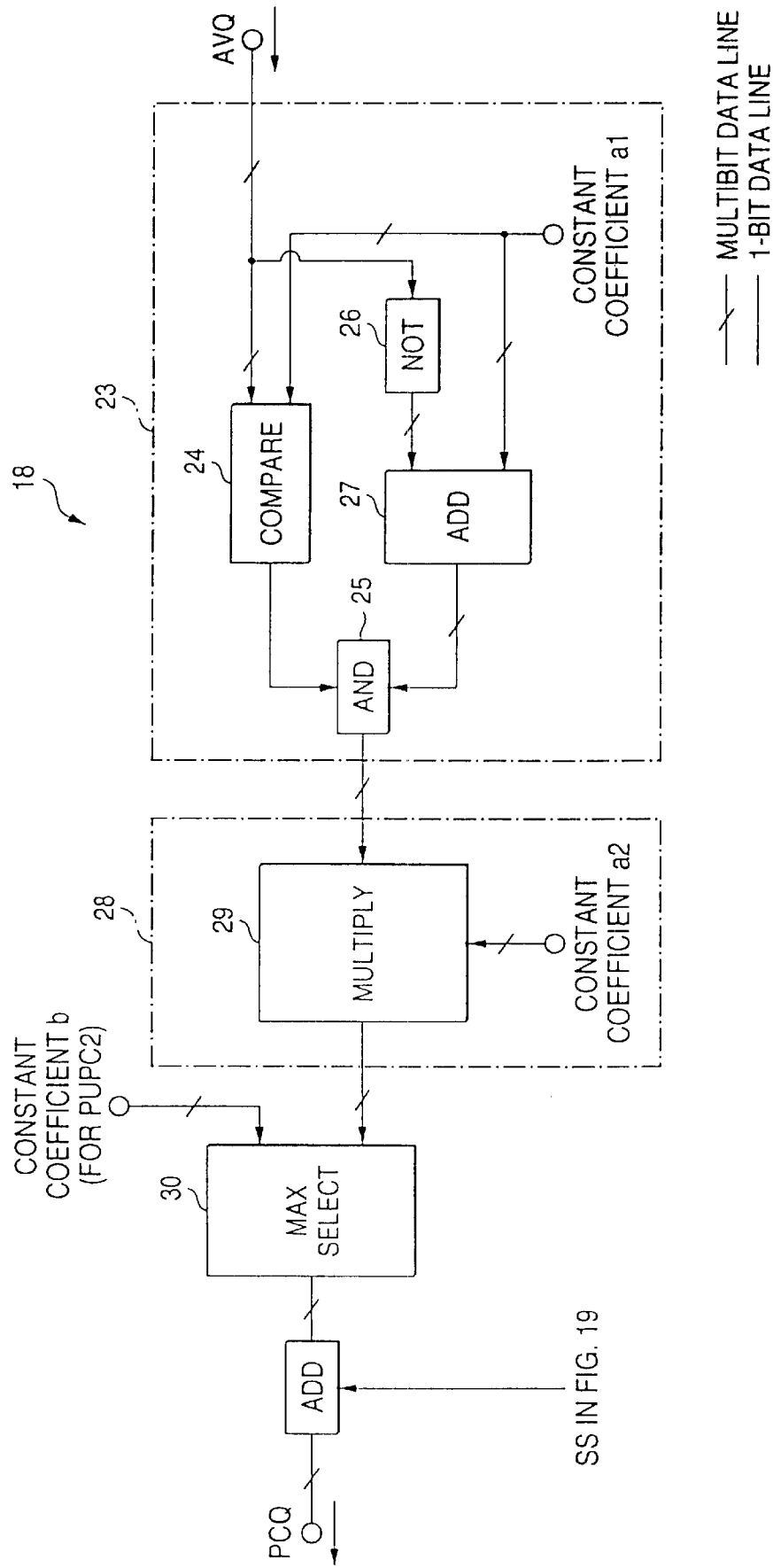
FIG. 17 is a diagram showing an example of the circuit structure of an operation section.

FIG. 17 shows an example of the circuit structure of the operation section, illustrating the operation section 18 related to the generation of the PUPC and the PUPC2. While a signal line is displayed as a single line for simplicity in FIG. 17, it is necessary to take note of the actual execution of a multibit digital data process.

First of all, the data AVQ corresponding to VL are transferred to a subtracting section 23 in which the processes (1) and (2) are executed.

The data AVQ are supplied to a comparing circuit 24 in the subtracting section 23 and are compared with the constant value of "a1" therein. If "AVQ<a1" is obtained, an H level signal of the comparing circuit 24 is supplied as one input of a multi-input AND (logical product) circuit 25.

The data AVQ are converted into a negative value through a NOT (logical negation or full bit inversion) circuit 26 and the negative value is then transferred to an adding circuit 27 and is added to a1 therein. The adding circuit 27 is constituted by using a full adder (a full adding device) and output data thereof are supplied to a remaining input terminal of the AND circuit 25.

The AND circuit 25 exactly sends the output of the adding circuit 25 to a multiplying section 28 in a subsequent stage when the output signal of the comparing circuit 24 has the H level, and sends an L level signal (equivalent to zero) for all bits to the multiplying section 28 when the output signal of the comparing circuit 24 has an L level.

A multiplying circuit 29 using a full adder is provided in the multiplying section 28, and data obtained as a result of a multiplication of the output data of the subtracting section 23 by a constant value a2 are transferred to a MAX selecting circuit (a circuit for selecting one of two data which is greater) 30 in a subsequent stage.

Data having a constant value "b" indicative of the PUPC2 are supplied to the MAX selecting circuit 30, and the same data and the data transferred from the multiplying section 28 are compared with each other and a value of one of them which is greater is employed and is then output as the "PCQ" through an adding circuit ADD.

It is apparent that the structures of the operation sections 16 and 17 related to the PUPA and the PUPB are also the same as those of FIG. 17 excluding the portion related to the generation of the PUPC2.

Figure 18:
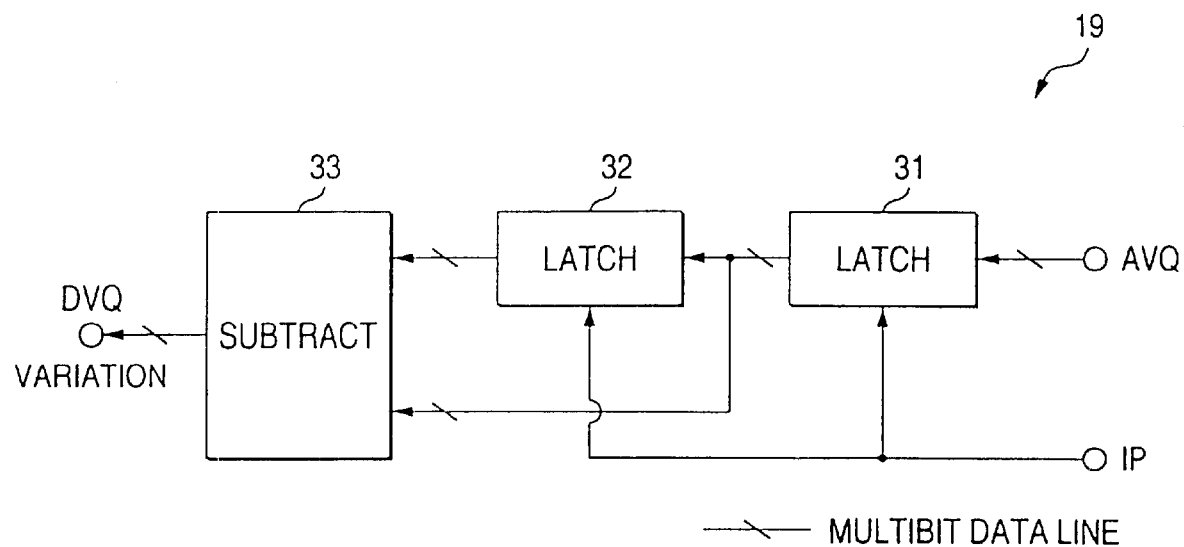
FIG. 18 is a diagram showing an example of the structure of a voltage variation detecting section.

The voltage variation detecting section 19 (abbreviated as "DV" in FIG. 14) is required for detecting a variation in the voltage VL and an example of a structure thereof is shown in FIG. 18.

Two latch circuits 31 and 32 and a subtracting circuit 33 are provided. When the data AVQ are supplied to the latch circuit 31 in a first stage, latch data of the same circuit and data obtained after passing through the latch circuit 32 in a second stage are transferred to the subtracting circuit 33. A difference between both data is calculated in the subtracting circuit 3 and difference data (indicated as "DVQ") are transferred to the operation section 18 of the PUPC and the PUPC2. An interval pulse "IP" (which corresponds to a clock pulse and defines a sampling time) generated by a timing control circuit which is not shown is supplied to the latch circuits 31 and 32 so that a latch timing is controlled.

Figure 19:
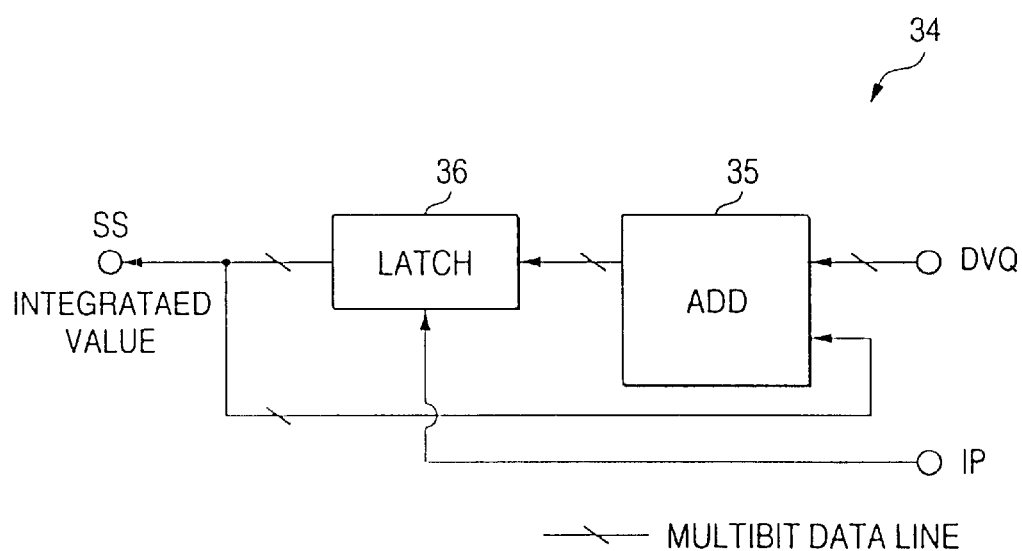
FIG. 19 is a circuit diagram showing an example of the structure of an integrating section for a voltage variation.

An integrating section for integrating a voltage variation is provided in the operation section 18 of the PUPC and the PUPC2, and a structure example 34 is shown in FIG. 19.

There are provided an adding circuit 35 to which the DVQ is supplied from the voltage variation detecting section 19 and a latch circuit 36. The output data of the latch circuit 36 are input to the adding circuit 35 and the data value of the DVQ is added thereto. Accordingly, the output of the latch circuit 36 indicates integrated value data "SS" (the data output is transferred to the adding circuit ADD in FIG. 17 and is added to the output of the MAX selecting circuit 30). The latch circuit 36 is operated upon receipt of the interval pulse IP.

The adding operation for the PUPC and the PUPC2 is carried out based on the output value of the integrating section 34 or a value obtained by multiplying the output value by a predetermined coefficient. Consequently, their control lines can be moved upward in the VL-IL chart. More specifically, the PUPC and the PUPC2 are positioned in the vicinity of an approximation line g for a constant power curve with a rated power immediately after light-up is started. When a variation in the voltage VL applied to the discharge lamp is detected and an integrated value thereof (a value indicated by data SS) is calculated, the PUPC and the PUPC2 are correspondingly moved temporarily in such a direction as to increase a power to be applied to the discharge lamp (such a direction as to go away from the VL axis) (since the control line is temporarily raised and is then lowered, it is shown in a two-way arrow Z in FIG. 2).

Figure 20:
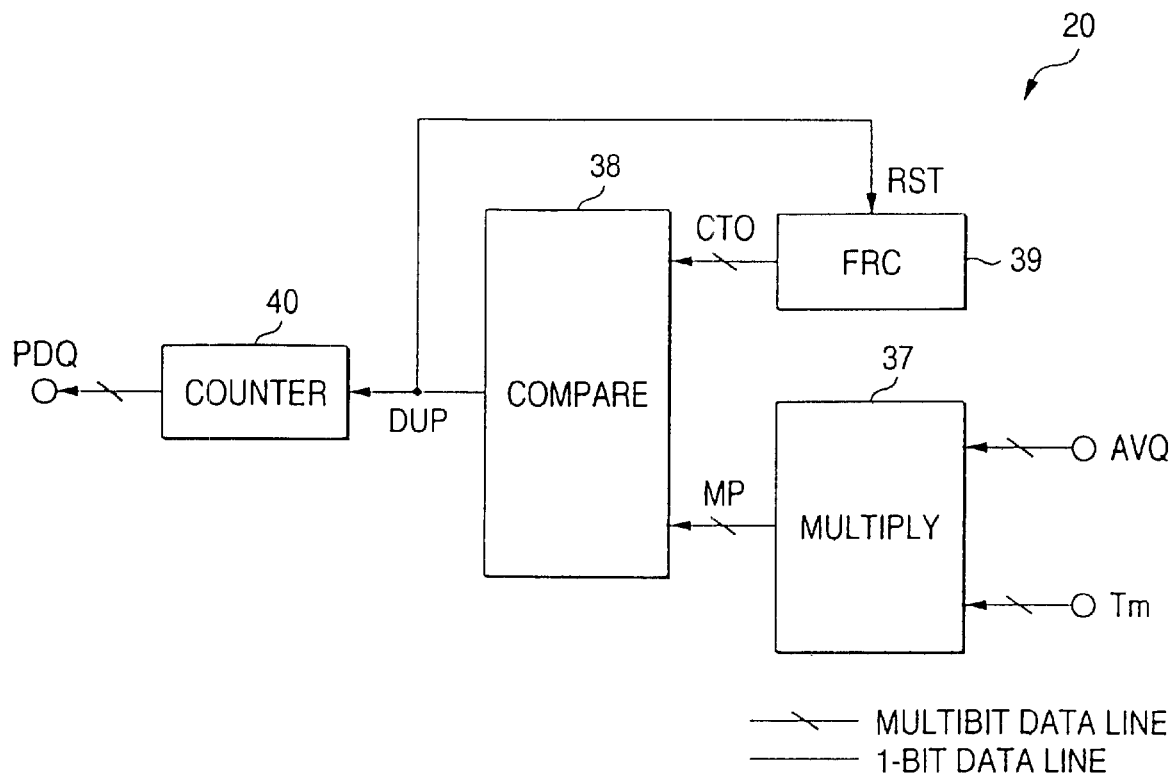
FIG. 20 is a diagram showing an example of the circuit structure of a power reducing control section.

A power reduction control section (or a reduced power specifying section which is indicated as "PD" in FIG. 14) 20 serves to generate data "PDQ" required for lowering the control line close to the VL axis in the VL-IL characteristic chart based on the data AVQ and information about an elapsed time and to send the data "PDQ" to the synthesizing section 21, and a structure example thereof is shown in FIG. 20.

First of all, the data AVQ and the data on the elapsed time (for example, counting data of a clock signal after the lighting start time which are indicated as "Tm") are multiplied through a multiplying circuit 37, and a result thereof (a multiplied value which is indicated as "MP") is transferred to a comparing circuit 38.

A count output (indicated as "CTO") of a free run (self-run) counter 39 (indicated as "FRC" in the drawing) is sent to the comparing circuit 38 and a result (indicated as "DUP") obtained by carrying out a level comparison with the multiplied value MP in the comparing circuit 38 is supplied to a reset terminal (RST) of the free run counter 39 and the free run counter 39 is reset synchronously with a rise in the DUP.

Figure 21:
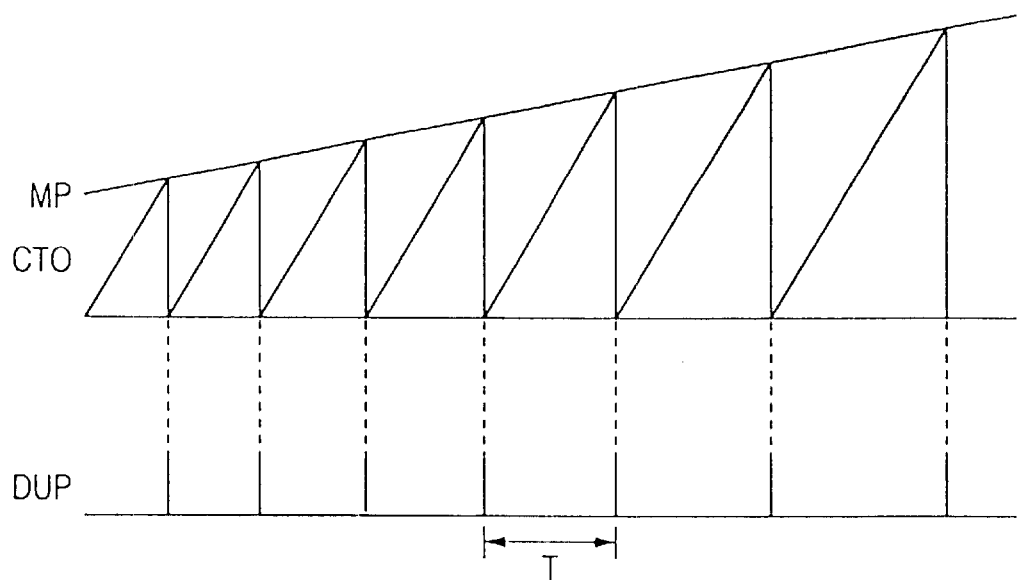
FIG. 21 is a diagram showing a waveform and phase relationship of each section in FIG. 20.

FIG. 21 shows a phase relationship between the multiplied value MP, the free run counter output CTO and the comparison result DUP.

As is apparent from FIG. 21, when the level of the CTO reaches the level of the MP, the DUP is temporarily set to have an H level and the free run counter 39 is reset. Therefore, the CTO becomes a saw tooth wave and a peak thereof is raised with an increase in the level of the MP. Referring to the DUP, an interval (generation interval) "T" of a pulse is increased with a rise in the MP.

The DUP is sent to a counter 40 and a count value is added by one every time the pulse for the DUP is received. With such a structure, an added value can be obtained as the PDQ.

The PDQ is sent to the synthesizing section 21 so that an increment (or an increase) exceeding a power in a steady state which is transiently applied to the discharge lamp is reduced with an increase in a product value (a voltage time product) of the data AVQ corresponding to a voltage applied to the discharge lamp and an elapsed time. Moreover, an increase in the interval T of the DUP with a rise in the MP implies that an adding interval in the counter 40 is extended with an increase in the voltage time product so that the speed of lowering the control line through the PDQ is reduced (see FIG. 10).

After the output data PAQ, PBQ and PCQ of the operation sections and the output data PDQ of the power reduction control section 20 are sent to the synthesizing section 21 and are synthesized, the output data (indicated as "GQ" in FIG. 14) are transferred to the digital-analog converting section 22 (abbreviated as "D/A" in FIG. 14). The data PAQ, PBQ and PCQ are processed by selecting the greatest one of the same data values (the reason is that the control line G corresponds to a side portion of a convex polygon obtained by selecting and synthesizing one of straight lines including the control sections which is positioned in an uppermost part as shown in FIG. 2). Next, the data value of the PDQ is subtracted from the selected data value (in order to reduce a power to be applied). A result obtained by full bit inverting the result of the subtraction is indicated as GQ. Accordingly, the synthesizing section 21 includes a MAX selecting circuit for the PAQ, the PBQ and the PCQ, a subtracting circuit for subtracting the PDQ from an output thereof, and a NOT (logical negation or full bit inversion) circuit.

The GQ is converted into an analog value through the digital-analog converting section 22 and is then transferred to the control line CL in FIG. 13 through a resistor. More specifically, in the case in which a voltage value corresponding to the data value of the GQ is small, a current flowing in a sink direction (a reverse direction to the arrow A3 in FIG. 13) is increased so that an increment in the power applied to the discharge lamp is made greater. To the contrary, when a current flowing in a source direction is increased with respect to the control line CL, the power to be applied is decreased. The data value which has not been subjected to the full bit inversion (which implies sign inversion) in the synthesizing section 21 is increased with an increase in each of the data values of the PAQ, the PBQ and the PCQ and a reduction in the data value of the PDQ. However, if the data value is exactly digital-analog converted and is then supplied to the control line CL, a relationship between the increase and decrease in the applied power is reversed. Accordingly, it is necessary to carry out the full bit inversion in order to correctly increase or decrease the applied power in accordance with a rule described with reference to FIG. 13. For example, therefore, if the data value of the GQ has 2 bytes (hexadecimal "00" to "FF"), a very large power is applied with "00".

In the invention, the detection of the voltage VL is a basic matter. Therefore, it is necessary to correctly carry out the same detection. For example, in the case in which the power control is to be carried out by utilizing an integrated value of the variation in the voltage VL (the control line is to be raised for the control sections of PUPC and PUPC2), it is necessary to take note of a problem in that an operation is carried out by setting, as the VL or a variation thereof, a voltage generated when switching a polarity for a voltage to be supplied to the discharge lamp. In other words, a voltage generated when switching a polarity in this case is applied by an inductance component (an inductive component) of a starting circuit for generating a high voltage pulse for starting, is higher than the substantial VL and is an apparent (or a false) voltage. Accordingly, in the case in which the operation is carried out by taking the voltage to be the VL, the same voltage is overestimated as a voltage having a greater absolute value than actually in place of the actual voltage VL. Consequently, there is a possibility that control might be hindered from being carried out in conformity with the actual condition.

Figure 22:
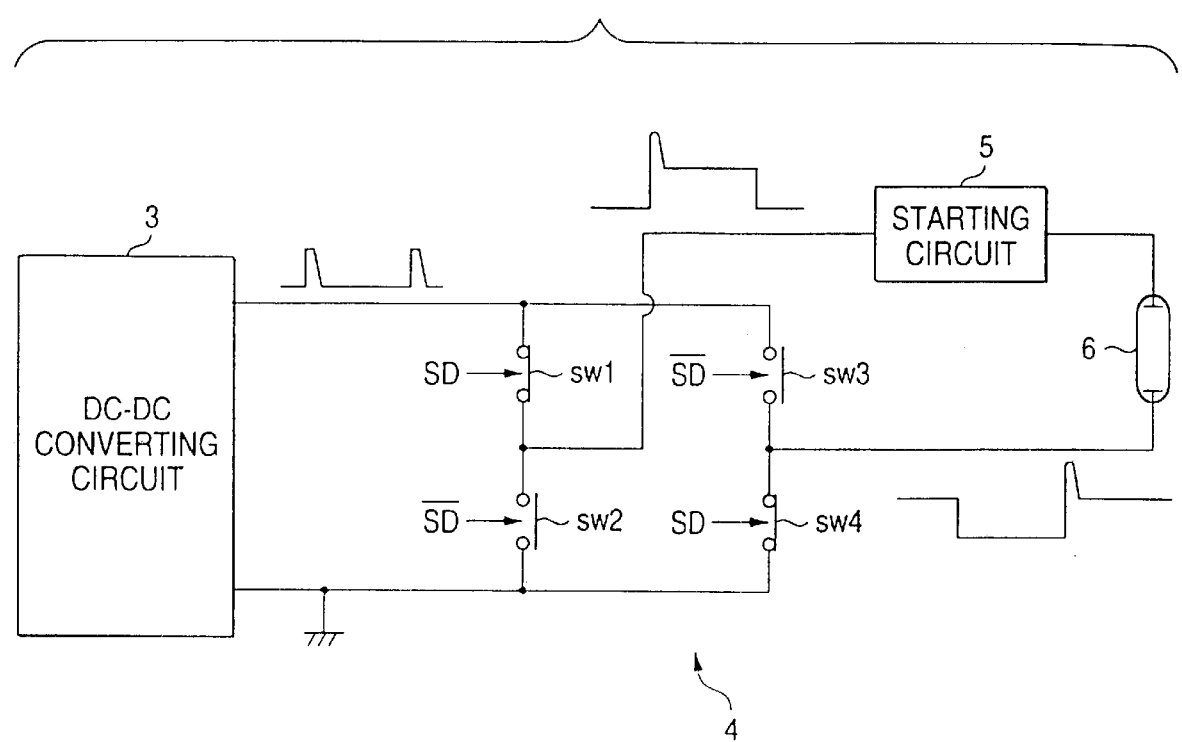
FIG. 22 is a diagram for explaining misdetection of voltage (VL) detection, schematically illustrating a DC—DC converting circuit and subsequent circuits.

FIG. 22 shows a DC—DC converting circuit, a DC-AC converting circuit and a starting circuit and illustrates a schematic output waveform related to the first two circuits.

In the embodiment, the DC-AC converting circuit 4 has a structure of a full bridge type using a plurality of switching elements (sw1 to sw4) and the polarity of a voltage to be supplied to the discharge lamp is switched by the alternating operation of each of the switching elements. More specifically, upon receipt of a signal sent from a control circuit which is not shown (a signal SD and a signal indicated as SD having a mark of a bar thereabove in the drawing), the elements sw1 and sw4 make a pair and the elements sw2 and sw3 make a pair to alternately carry out switching control. Therefore, such a condition that a rapid rise or drop in a voltage is caused is assumed with an impulsive voltage generated when switching the polarity during the alternating operation.

It is desirable that a voltage detection value detected immediately after or before and after the polarity of the voltage supplied to the discharge lamp is switched should be unemployed as a formal detection value or be disregarded to prevent incorrect detection (a voltage applied to the discharge lamp is not detected immediately after the polarity is switched or before and after the switching).

There is a method using proper filter means (for example, a digital filter for making a level uniform by averaging data) in order to avoid a generated voltage to be the cause of the misoperation. However, such a method might cause an increase in a circuit scale or a cost. For example, therefore, the following configuration is used.

(1) A circuit configuration in which a pulse produced by temporarily stopping the generation of the interval pulse IP (see FIG. 18) is used as a new interval pulse.
(2) A circuit configuration in which a consideration is taken such that a timing for detecting an impulsive voltage is not caused, thereby generating an interval pulse from the beginning.

According to the configuration (1), the data on the AVQ corresponding to the VL are prevented from being latched immediately after a polarity is switched or before and after the switching such that the AVQ cannot be utilized as voltage detection data.

In the example shown in FIG. 22, the timing of switching the polarity by the alternating operation of the DC-AC converting circuit is controlled in response to a signal SD and the signal SD is created based on a clock signal generated by a signal generating circuit which is not shown. Therefore, the signal SD (or an inversion signal of the same signal) and a basic signal for the generation of the signal SD can be utilized. In other words, it is preferable that a rise or fall in the signal should be detected to temporarily prohibit the generation of the interval pulse IP for a predetermined period (a period in which the impulsive voltage is to be masked).

Figure 23:
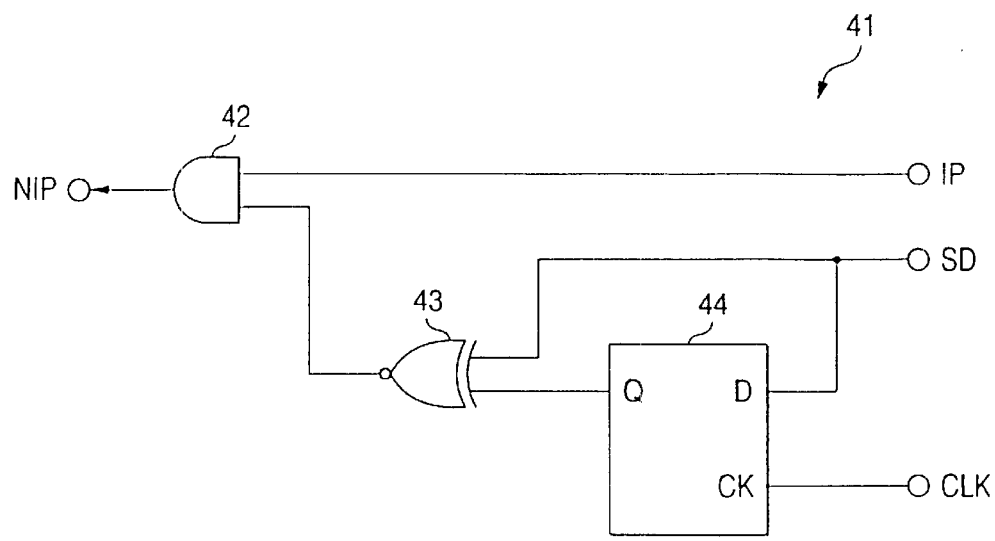
FIG. 23 is a diagram showing an example of a circuit structure for a misdetection measure.

FIG. 23 shows a structure example 41 for the foregoing, comprising a 2-input AND (logical product) gate 42, a 2-input EXNOR (Exclusive-Not-OR) gate 43 and a D flip-flop 44.

First of all, a signal SD (for example, 500 Hz) for polarity switching (or polarity inversion) in the DC-AC converting circuit is supplied to a D input terminal of the D flip-flop 44 and one of input terminals of the EXNOR gate 43. A reference signal (indicated as "CLK") having a predetermined frequency (for example, 2000 Hz) is supplied to a clock signal input terminal (CK) of the D flip-flop 44, and a Q output signal of the D flip-flop 44 is supplied to the other input terminal of the EXNOR gate 43.

The interval pulse IP is generated at a regular interval from a generating circuit which is not shown, and is supplied to one of input terminals of the AND gate 42. The output signal of the EXNOR gate 43 is supplied to the other input terminal of the AND gate.

A signal output from the AND gate 42 (which is indicated as "NIP") is used in place of the signal IP and defines the latch operation.

Figure 24:
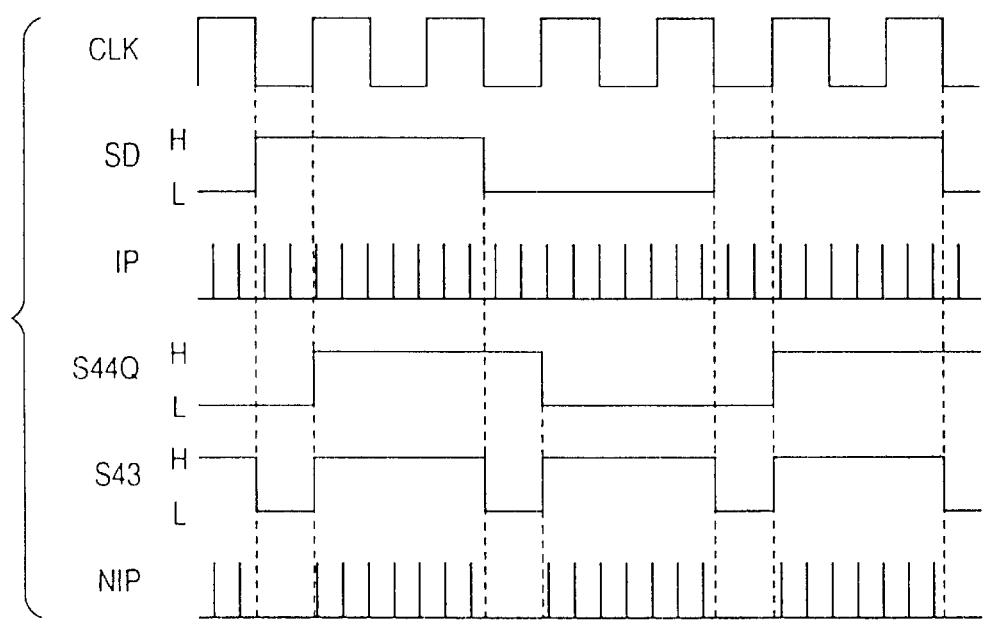
FIG. 24 is a timing chart showing the signal relationship of each section in FIG. 23.

FIG. 24 is a timing chart showing the signal of each portion in a circuit, and marks other than the above-mentioned marks in the drawing have the following meaning.

"S44Q"=the Q output signal of the D flip-flop 44; and
"S43"=the output signal of the EXNOR gate 43.

In the drawing, "H" indicates a high level and "L" indicates a low level.

As is apparent from the drawing, the S44Q is slightly delayed from the signal SD for polarity inversion with a rise timing of the CLK. Therefore, when both of the signals SD and S44Q have the H level, the S43 has the H level. Accordingly, while the IP passes by the AND gate 42 to be NIP only at that time, the NIP has the L level and the IP is masked when the S43 has the L level (for a predetermined period from the time of polarity switching). Therefore, the pulse does not rise (accordingly, the AVQ is prohibited from being latched through the NIP).

Referring to the configuration (2), the NIP is not generated from the IP differently from the configuration (1) but a signal having a pulse which does not rise in the vicinity of polarity inversion from the beginning is generated and is utilized for the NIP. More specifically, the AND gate 42 is removed in FIG. 23 and the frequency of the CLK is increased to generate a high frequency signal. It is preferable that the EXNOR gate 43 should be replaced with an EXOR (Exclusive-OR) gate to utilize the output signal of the same gate for the NIP. In this case, the output signal of the EXOR gate has the L level for a period from the rising time of the SD to the fall of the CLK after the S44Q of the D flip-flop 44 rises. For this period, the pulse of the NIP does not rise. Therefore, it is apparent that the data AVQ are not latched immediately after the polarity inversion. Moreover, it is advantageous that a circuit structure is more simplified as compared with the configuration (1) because the IP is not required.

In both of the configurations, the voltage applied to the discharge lamp is not detected immediately after or before and after the polarity of the voltage supplied to the discharge lamp is switched. Therefore, it is possible to produce an advantage that the impulsive voltage can be precisely prevented from being misdetected as the voltage VL.

As is apparent from the foregoing, according to the first aspect of the invention, when controlling the power to be transiently applied to the discharge lamp, only the detection information necessary for the power control of the discharge lamp is utilized and it is possible to remove a circuit and a device which are required for detecting a cooling condition after the light-out of the discharge lamp and a time taken from last light-out to light-up. Referring to the information about the passage of time, it is preferable to measure a time that the discharge lamp is lighted up or a time taken after the start of the operation of the lighting circuit. Therefore, timing means using a capacitor having a large capacity is not required. Accordingly, it is possible to reduce a cost and the size of a device.

According to the second aspect of the invention, by controlling the increment in the power applied to the discharge lamp based on the product of the voltage applied to the discharge lamp and the elapsed time, a transient necessary power corresponding to the condition of the discharge lamp can be controlled by utilizing existing power control. Therefore, it is possible to gain an advantage that a cost can be reduced.

According to the third aspect of the invention, it is possible to enhance the rising characteristic of the luminous flux of the discharge lamp, thereby preventing the shortage of the amount of light.

According to the fourth aspect of the invention, it is possible to guarantee the accuracy of the control and stable power control by eliminating a bad effect produced due to misdetection of the voltage applied to the discharge lamp.

What is claimed is:

1. A discharge lamp lighting circuit comprising:

a DC—DC converting circuit for receiving a DC input voltage and converting the DC input voltage into a desired DC voltage;

a DC-AC converting circuit for converting an output voltage of the DC—DC converting circuit into an AC voltage and then supplying the AC voltage to a discharge lamp;

a starting circuit for generating a starting pulse to be sent to the discharge lamp; and a control circuit for controlling a power to be applied to the discharge lamp, wherein the control circuit carries out power control in a steady state of the discharge lamp in response to a detection signal for a voltage applied to the discharge lamp and a current flowing to the discharge lamp and carries out output control of the DC—DC converting circuit for controlling a power to be transiently applied to the discharge lamp before a transition to the power control;

the power to be transiently applied is set to be higher than the power in the steady state and light emission of the discharge lamp is promoted to cause a luminous flux of the discharge lamp to approximate to a luminous flux in a steady state in a short time; and an increment in the power to be transiently applied in the above which exceeds the power in the steady state is specified by the control circuit corresponding to a voltage applied to the discharge lamp, a variation in the voltage and a time elapsed from a time that the discharge lamp is lighted up or a start of an operation of a lighting circuit.

2. The discharge lamp lighting circuit according to claim 1, wherein the increment in the power to be transiently applied which exceeds the power in the steady state is reduced when a product of the voltage applied to the discharge lamp and the elapsed time is increased.

3. The discharge lamp lighting circuit according to claim 1, wherein a degree of a decrease or a speed of the increment in the power to be transiently applied which exceeds the power in the steady state is reduced when the voltage applied to the discharge lamp is increased or the elapsed time is prolonged.

4. The discharge lamp lighting circuit according to claim 2, wherein the DC-AC converting circuit has a circuit structure of a bridge type using a plurality of switching elements and a voltage applied to the discharge lamp is not detected immediately after or before and after a polarity of a voltage supplied to the discharge lamp is switched by an alternating operation of each of the switching elements.

5. The discharge lamp lighting circuit according to claim 3, wherein the DC-AC converting circuit has a circuit structure of a bridge type using a plurality of switching elements and a voltage applied to the discharge lamp is not detected immediately after or before and after a polarity of a voltage supplied to the discharge lamp is switched by an alternating operation of each of the switching elements.

6. The discharge lamp lighting circuit according to claim 4, wherein at the time of the alternating operation of each of the switching elements, detection of the voltage applied to the discharge lamp is inhibited.

7. The discharge lamp lighting circuit according to claim 4, wherein detection interval to detect the voltage applied to the discharge lamp is shifted from the alternating operation of the each of the switching elements.

8. The discharge lamp lighting circuit according to claim 5, wherein at the time of the alternating operation of each of the switching elements, detection of the voltage applied to the discharge lamp is inhibited.

9. The discharge lamp lighting circuit according to claim 5, wherein detection interval to detect the voltage applied to the discharge lamp is shifted from the alternating operation of the each of the switching elements.

* * * * *